United States Patent
Siegel et al.

(10) Patent No.: US 11,178,094 B2
(45) Date of Patent: *Nov. 16, 2021

(54) PER-SESSION INVOCATION OF PRIORITY SERVICES BASED UPON NETWORK AVAILABLE INFORMATION

(71) Applicant: AT&T Intellectual Property I, L.P., Atlanta, GA (US)

(72) Inventors: Steven A. Siegel, Mendham, NJ (US); Keylor Eng, Seattle, WA (US); Anisa Parikh, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/240,907

(22) Filed: Jan. 7, 2019

(65) Prior Publication Data
US 2019/0158449 A1    May 23, 2019

Related U.S. Application Data

(63) Continuation of application No. 15/607,558, filed on May 29, 2017, now Pat. No. 10,178,064, which is a
(Continued)

(51) Int. Cl.
*H04L 12/58* (2006.01)
*H04L 12/18* (2006.01)
*H04L 29/06* (2006.01)

(52) U.S. Cl.
CPC .......... *H04L 51/26* (2013.01); *H04L 12/1881* (2013.01); *H04L 63/0407* (2013.01); *H04L 63/0428* (2013.01); *H04L 63/10* (2013.01)

(58) Field of Classification Search
CPC .............. H04L 29/08072; H04L 29/06; H04L 29/0809; H04L 63/08; H04L 63/102
(Continued)

(56) References Cited

U.S. PATENT DOCUMENTS 5,574,977 A   11/1996 Joseph et al.
5,615,249 A    3/1997 Solondz
(Continued)

FOREIGN PATENT DOCUMENTS

WO   WO 2010/121645   10/2010

OTHER PUBLICATIONS

Hsuan-Jung Su and On-Ching Yue, "Mobile Initiated Priority Access Solutions for Cellular Networks," Vehicular Technology Conference, 2004, VTC 2004-Spring, 2004 IEEE 59th, vol. 3, IEEE.
(Continued)

*Primary Examiner* — Mahran Y Abu Roumi
(74) *Attorney, Agent, or Firm* — Hartman & Citrin LLC

(57) ABSTRACT

Concepts and technologies disclosed herein are directed to per-session invocation of priority services based upon network available information. A service architecture can include a service architecture core and a service execution runtime framework in which a priority service application is executable to perform operations to provide a priority service for a communications session. The priority service application can determine whether a priority service should be invoked for the communications session based upon priority criteria. If a determination is made that the priority service is to be invoked for the communications session based upon the priority criteria, the priority service application can invoke the priority service for the communications session. If a determination is made that the priority service is not to be invoked for the communications session based upon the priority criteria, the priority service application can cause the communications session to be coordinated without the priority service.

14 Claims, 17 Drawing Sheets

Related U.S. Application Data continuation of application No. 14/070,653, filed on Nov. 4, 2013, now Pat. No. 9,667,582.

(58) Field of Classification Search
   USPC .......................................................... 709/229
   See application file for complete search history.

(56) References Cited

U.S. PATENT DOCUMENTS

| | | | |
|---|---|---|---|
| 6,112,101 | A | 8/2000 | Bhatia et al. |
| 8,275,349 | B2 | 9/2012 | Smith |
| 8,442,480 | B2 | 5/2013 | Shah |
| 8,457,591 | B2 | 6/2013 | Lambert et al. |
| 2008/0031219 | A1 | 2/2008 | Zou |
| 2009/0182565 | A1* | 7/2009 | Erickson ............... G06F 8/34 |
| | | | 705/300 |
| 2010/0135287 | A1* | 6/2010 | Hosain ............... H04L 47/10 |
| | | | 370/389 |
| 2010/0316045 | A1* | 12/2010 | Przybysz ........... H04L 65/1006 |
| | | | 370/352 |
| 2012/0115432 | A1 | 5/2012 | Blanco et al. |
| 2012/0142306 | A1* | 6/2012 | Shah ..................... H04W 4/90 |
| | | | 455/404.1 |
| 2012/0240205 | A1 | 9/2012 | Casey |
| 2012/0282879 | A1* | 11/2012 | Smith ............... H04W 72/1247 |
| | | | 455/404.1 |

OTHER PUBLICATIONS

Christopher Redding and Carol-Lyn Taylor, "Priority Access Service in Cellular and PCS Networks," Military Communications Conference, 2001, Communications for Network-Centric Operations: Creating the Information Force, vol. 1, IEEE.

AT&T Architecture and Network Realization and AT&T Architecture and Planning, "AT&T's Common Architecture for Real-Time Services (CARTS)," Aug. 2010, AT&T Intellectual Property.

U.S. Office Action dated Nov. 20, 2015 in U.S. Appl. No. 14/070,653.
U.S. Office Action dated Jun. 24, 2016 in U.S. Appl. No. 14/070,653.
U.S. Notice of Allowance dated Jan. 13, 2017 in U.S. Appl. No. 14/070,653.
U.S. Office Action dated Aug. 10, 2017 in U.S. Appl. No. 15/607,558.
U.S. Office Action dated Feb. 20, 2018 in U.S. Appl. No. 15/607,558.
U.S. Notice of Allowance dated Aug. 29, 2018 in U.S. Appl. No. 15/607,558.

\* cited by examiner

PER-SESSION INVOCATION OF PRIORITY SERVICES BASED UPON NETWORK AVAILABLE INFORMATION

CROSS-REFERENCE TO RELATED APPLICATIONS

This application is a continuation of and claims priority to U.S. patent application Ser. No. 15/607,558, entitled "Per-Session Invocation of Priority Services Based Upon Network Available Information," filed May 29, 2017, now U.S. Pat. No. 10,178,064, which is a continuation of and claims priority to U.S. patent application Ser. No. 14/070,653, entitled "Per-Session Invocation of Priority Services Based Upon Network Available Information," filed Nov. 4, 2013, now U.S. Pat. No. 9,667,582, which are incorporated herein by reference in their entireties.

BACKGROUND

Some telecommunications carriers provide priority services to enable the prioritization of voice and data calls to and from devices during emergency situations. Prioritized calls are more likely to be completed successfully than calls for which priority services are not enabled. One implementation of a priority service is to provide a priority service subscriber with a special digit code that is dialed before a destination telephone number to inform the network that the call should be treated with priority. In emergency situations where network resources are crucial to coordinating emergency recovery efforts, the special digit code implementation of a priority service may provide subscribers with more choice than appropriate, thereby possibly allowing their calls to be successfully completed instead of other prioritized calls which may be crucial to the coordination of the emergency recovery efforts.

By way of example, a natural disaster from the perspective of a carrier's network may show a significant increase of voice and data traffic to and from the affected area(s). This is due in part to many individuals attempting to reach friends and family that may have been affected, and those affected attempting to reach friends and family to report on their circumstances. While these attempts to reach friends and family are often profoundly meaningful to the individuals involved, the possibility of network resources being prioritized to coordinate such communications instead of network resources being focused on emergency recovery efforts could affect the ability of first responders and other emergency personnel to communicate effectively, potentially leading to stalled recovery efforts and even the loss of life. The likelihood that prioritized calls will complete when a large number of people have priority for their calls, especially in an emergency situation where network resources are limited, is dramatically decreased, and therefore depreciates the effectiveness of priority services.

SUMMARY

Concepts and technologies disclosed herein are directed to per-session invocation of priority services based upon network available information. According to one aspect, a service architecture can include a service architecture core and a service execution runtime framework in which a priority service application is executable to perform operations to provide a priority service for a communications session. The priority service application can determine whether a priority service should be invoked for the communications session based upon priority criteria. In response to determining that the priority service should be invoked for the communications session, the priority service application can invoke the priority service for the communications session. In response to determining that the priority service should not be invoked for the communications session, the priority service application can cause the communications session to be coordinated without the priority service.

In some embodiments, the service architecture can also include a priority service application repository. In these embodiments, the priority service application can receive a request to authorize a user participating in the communications session to access the priority service, generate a query directed to the priority service application repository, send the query to the priority service application repository, and receive a query response from the priority service application repository. The priority service application can analyze the query response to determine whether the user is authorized to access the priority service and allow or deny the priority service to be invoked based upon this determination.

In some embodiments, the priority service application determines whether a priority service should be invoked for the communications session based, at least in part, upon a type of the communications session. In some embodiments, the priority service application determines whether a priority service should be invoked for the communications session based, at least in part, upon a type of the communications session. In some embodiments, the priority service application determines whether a priority service should be invoked for the communications session based, at least in part, upon an originating party of the communications session. In some embodiments, the priority service application determines whether a priority service should be invoked for the communications session based, at least in part, upon a destination party of the communications session. In some embodiments, the priority service application determines whether a priority service should be invoked for the communications session based, at least in part, upon a network condition from a network node associated with the communications session. In some embodiments, the priority service application determines whether a priority service should be invoked for the communications session based, at least in part, upon contextual data for an area in which at least one of an originating device and a destination device associated with the communications session are located. The priority service application can then apply a priority treatment appropriate for the priority criteria to the communications session.

In some embodiments, the priority service application generates a priority handling indicator, adds the priority handling indicator to a message associated with coordination of the communications session to create a marked message, and forwards the marked message to a network node that is used, at least in part, in the coordination of the communications session. The priority handling indication, in some embodiments, is added to a header of the message to create the marked message.

In some embodiments, the priority service application generates instructions for handling protocol interworking between technology domains on a network that is coordinating, at least in part, the communications session and sends the instructions to the network. In some other embodiments, the priority service application generates instructions for handling network interconnections between multiple networks that are coordinating, at least in part, the communications session and sends the instructions to the networks.

In some embodiments, both sets of instructions are utilized to provide a priority interworking function for the service architecture.

In some embodiments, the priority service application receives policy details, analyzes the policy details to determine access network quality of service resources to allocate to the communications session, and allocates the access network quality of service resources to the communications session in accordance with the policy details. The policy details may be received, at least in part, from a government entity, a public safety entity, or a business entity.

In some embodiments, the priority service application receives policy details, analyzes the policy details to determine an anonymity treatment that should be applied for at least one of an originating party and a destination party, and applies the anonymity treatment to at least one of the originating party and the destination party in response to determining that the anonymity treatment should be applied. The anonymity treatment can include a location suppression treatment, a number translation treatment, or both.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
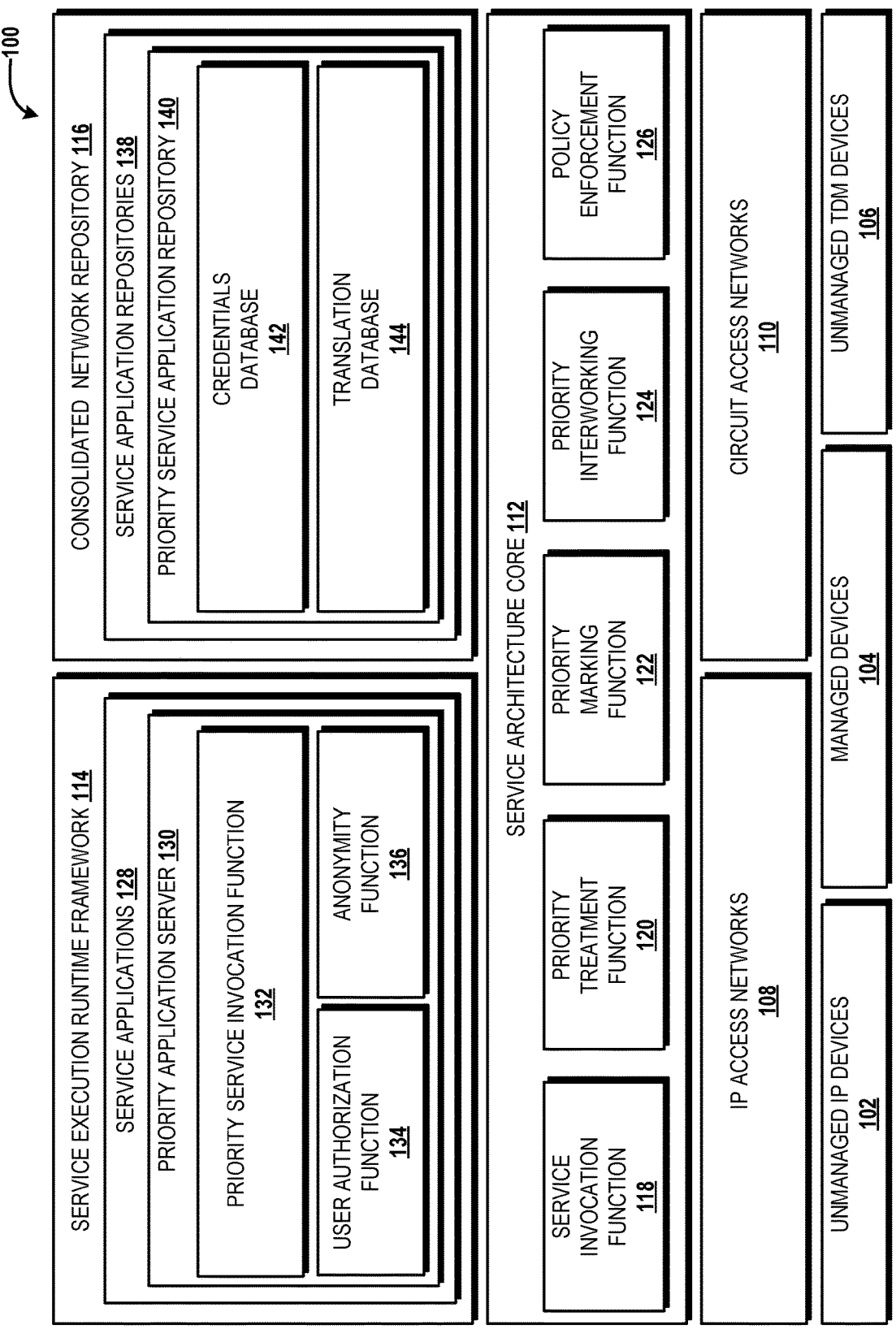
FIG. 1 is a block diagram illustrating aspects of an illustrative service architecture for implementing the various concepts and technologies disclosed herein.

The following detailed description is directed to per-session invocation of priority services based upon network available information. Per-session invocation of priority services can enable more efficient use of network resources, especially when a network is under stress, such as a sudden increase in network traffic due to a natural disaster, terrorist attack, or other emergency situation. According to one aspect of the concepts and technologies disclosed herein, a government agency, organization, or other entity can prioritize communications sessions, such as, for example, a voice communications session; a video communications session; a guaranteed bit rate ("GBR") data service, which might be a voice service, a video service, or a web service with GBR; a data transport (non-GBR) service, which might be a voice service, a video service or a web service without GBR; a web service for an RTC endpoint; a short message service ("SMS") over Internet protocol ("IP"); an instant messaging service; or a chat service. For example, the concepts and technologies disclosed herein can be used to prioritize calls to and from a dispatch facility for the dispatch of police, firefighter, medical, and other public safety personnel. Similarly, communications sessions among police, firefighter, medical, and other public safety personnel are prioritized, while calls outside of these groups, such as calls to friends and family, are not prioritized. The conditions under which calls and/or other communications sessions should be prioritized can be decided by the agency, such as the police department, rather than leaving the prioritization decision to the individuals of the agency, such as the police officers.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of per-session invocation of priority services based upon network available information will be presented.

Referring now to FIG. 1, aspects of an illustrative service architecture 100 for implementing various embodiments of the concepts and technologies disclosed herein for per-session invocation of priority services based upon network available information will be described. The service architecture 100 shown in FIG. 1 is a simplified architecture that may be implemented by or for a telecommunications service provider to provide various communications services to a plurality of users. The service architecture 100 will be described as part of a framework for providing services in an access-agnostic networking environment. Aspects of the service architecture 100, however, may be applied to networking environments that are not access-agnostic, and as such, the illustrative embodiments described herein should not be construed as being limiting in this regard.

In some embodiments, the service architecture 100 is implemented as part of an IP Multimedia Subsystem ("IMS"). In some other embodiments, the service architecture 100 is implemented as part of a customized framework for providing services in an access-agnostic networking environment, an example of which is Common Architecture for Real-Time Services ("CARTS"), available from AT&T Inc., Dallas, Tex. The service architecture 100 is simplified to show various hardware and software components that can be utilized to perform various operations for invoking priority services based upon network available information on a per-session basis. As such, the service architecture 100 should be considered as a partial service architecture that focuses on components used to perform various operations for invoking priority services based upon network available information on a per-session basis, but in actual implementation, the service architecture 100 may be part of a larger framework designed to provide communications services with and without priority.

The illustrated service architecture 100 is divided into different layers, the first of which includes a number of devices and is illustrated at the bottom of FIG. 1. In particular, the service architecture 100 can provide service to different device types, including, as in the illustrated embodiment, one or more unmanaged IP devices 102, one or more managed devices 104, and one or more unmanaged time-division multiplexing ("TDM") devices 106. The unmanaged device(s) 102 can include devices not managed by a service provider associated with the service architecture 100, some examples of which include, but are not limited to, personal computers, tablets, personal digital assistants ("PDAs"), and IP private branch exchanges ("IP-PBX"). The managed device(s) 104 can include devices managed by a service provider associated with the service architecture 100, some examples of which include, but are not limited to, cell phones (including feature phones and smart phones), gateways, routers, and set-top boxes. The unmanaged TDM devices 106 can include devices not managed by a service provider associated with the service architecture 100 and that utilize TDM, some examples of which include traditional PBXs and traditional TDM-based wired telephones. The unmanaged IP device(s) 102, the managed device(s) 104, and the unmanaged TDM device(s) 106 can utilize applications provided by the service architecture 100 depending upon the capabilities of each device. As such, some of the unmanaged IP device(s) 102, the managed device(s) 104, and/or the unmanaged TDM device(s) 106 might be able to utilize the priority services described herein, while others might not due to device capability limitations.

The unmanaged IP device(s) 102, the managed device(s) 104, and the unmanaged TDM device(s) 106 are capable of connecting to one or more access networks, such as one or more IP access networks 108 and/or one or more circuit access networks 110. The IP access networks 108 can include IP-based packet-switched networks, such as, for example, the Internet, managed IP services, and/or a Third Generation Partnership Project ("3GPP") standards-based packet-switched network. The circuit access networks 110 can include circuit-switched networks, such as, for example, a plain old telephone service ("POTS") network, a public-switched telephone network ("PSTN"), and/or a 3GPP standards-based circuit-switched network.

The IP access networks 108 and the circuit access networks 110 provide the unmanaged IP devices 102, the managed devices 104, and the unmanaged TDM devices 106 access to a service architecture core 112. The service architecture core 112, in turn, communicates with a service execution runtime framework 114 and a consolidated network repository 116 to coordinate the invocation of priority services on a per-session basis in accordance with various embodiments disclosed herein.

The illustrated service architecture core 112 includes a plurality of functions, each of which may be implemented in hardware and/or software to perform various operations described in greater detail herein below. If the functions are implemented in software, instructions for performing the functions may be executed by one or more processors to cause the processors to perform various operations described in greater detail herein below. As such, although the service architecture core 112 is illustrated as including functions that may be embodied as software components, the service architecture core 112 can also include one or more hardware processor components to carry out these functions through execution of software instructions included in the software components. Moreover, although the functions are shown as separate components within the service architecture core 112, one or more combinations of two or more of the functions are contemplated depending upon the particular implementation of the service architecture 100. Each function shown in the service architecture core 112 will now be described in greater detail.

The service architecture core 112 includes a service invocation function 118. The service invocation function 118 is utilized, at least in part, to invoke services for the service architecture 100. The service invocation function 118 can communicate with the service execution runtime framework 114 to cause the service execution runtime framework 114 to invoke one or more services as will be described in greater detail below.

The service architecture core 112 also includes a priority treatment function 120. The priority treatment function 120 is utilized, at least in part, to apply a priority treatment to a communications session for which a priority service has been invoked. Additional details regarding the operations performed by the priority treatment function 120 are described herein below with reference to FIGS. 2 and 5.

In some embodiments, the priority treatment function 120 prioritizes new communications session requests in a queue when a network overload condition exists. In some other embodiments, the priority treatment function 120 pre-empts existing non-prioritized communications sessions when a network overload condition exists. In some other embodiments, the priority treatment function 120 exempts a prioritized communications session from congestion controls that are utilized to mitigate the effects of congestion on a network when a network overload condition exists. The priority treatment function 120 may provide multiple priority treatments to a communications session, including a combination of the treatments described above. It should be understood that the priority treatment function 120 can apply other priority treatments other than the priority treatments described above. Some service providers may provide priority treatments that are particular to a specific implementation of the service architecture 100, a specific implementation of an equivalent architecture, or a specific implementation of an architecture that otherwise embodies the per-session invocation of priority services concepts and technologies disclosed herein, and therefore the priority treatments described above should not be construed as being limiting in any way.

The service architecture core 112 also includes a priority marking function 122. The priority marking function 122 is utilized, at least in part, to add markings within messages that indicate a communications session should be handled in accordance with a priority treatment applied by the priority treatment function 120. Additional details regarding the operations performed by the priority marking function 122 are described herein below with reference to FIGS. 2 and 6.

In some embodiments, the priority marking function 122 adds one or more markings (e.g., one or more indicators) to one or more session headers so that network nodes that receive the session headers can coordinate a communications session in accordance with the priority treatment indicated. It is contemplated that the markings may be added to an existing field of a session header and/or a new field.

The service architecture core 112 also includes a priority interworking function 124. The priority interworking function 124 coordinates priority treatment as designated by the priority treatment function 120 at network interconnections, which may include inter and intra-network connections. The priority interworking function 124 also enables protocol interworking between different technology domains of the same network. Additional details regarding the operations performed by the priority interworking function 124 are described herein below with reference to FIGS. 2 and 7.

The service architecture core 112 also includes a policy enforcement function 126. The policy enforcement function 126 enforces admission control policy decision with regard to the use of network quality of service ("QoS") resources of the IP access networks 108 and the circuit access networks 110 to provide priority service requests with a high likelihood of being successful. Additional details regarding the operations performed by the priority enforcement function 126 are described herein below with reference to FIGS. 2 and 8.

As noted above, the service architecture core 112 communicates with the service execution runtime framework 114 and the consolidated network repository 116 to coordinate the invocation of priority services on a per-session basis in accordance with various embodiments disclosed herein. The service execution runtime framework 114 provides a runtime environment in which one or more applications may be run so as to enable the service architecture 100 to provide one or more services to one or more users. In the illustrated example, the service execution runtime framework 114 includes one or more service applications 128, which, in turn, include a priority application server 130. The service applications 128 can include any number of applications for providing any number of services to one or more users. The illustrated example focuses on a priority service, and so only the priority application server 130 is illustrated. In actual implementation, however, the service applications 128 likely will include additional applications that provide one or more users access to additional services via the IP access networks 108 and/or the circuit access networks 110.

The priority application server 130 includes a plurality of functions, each of which may be implemented in hardware and/or software to perform various operations described in greater detail herein below. If the functions are implemented in software, instructions for performing the functions may be executed by one or more processors allocated to or part of the priority application server 130 to cause the processors to perform various operations described in greater detail herein below. As such, although the priority application server 130 is illustrated as including functions that may be embodied as software components, the priority application server 130 can also include or utilize one or more hardware processor components to carry out these functions through execution of software instructions included in the software components. Moreover, although the functions are shown as separate components within the priority application server 130, one or more combinations of two or more of the functions are contemplated depending upon the particular implementation of the priority application server 130. Each function shown in the priority application server 130 will now be described in greater detail.

The priority application server 130 includes a priority service invocation function 132. The priority service invocation function 132 determines whether a priority service should be invoked for a communications session. Additional details regarding the operations performed by the priority service invocation function 132 are described herein below with reference to FIGS. 2 and 3.

In some embodiments, priority service invocation is based upon one or more credentials. In these embodiments, a user can enter a unique identifier that uniquely identifies the priority service for that user and one or more credentials, such as, but not limited to, a password, personal identification number ("PIN"), security question answer, username, and/or biometric credential(s) (e.g., fingerprint, retinal scan, voiceprint, or the like). By way of example, and not limitation, a user may enter his or her unique identifier followed by the destination telephone number associated with the destination party with whom he or she desires to communicate. The unique identifier and credential(s) may be compared to a database located within the consolidated network repository 116 as will be described in greater detail below.

Priority service invocation, in some other embodiments, is based upon a service provider subscription model. In these embodiments, a subscription arrangement can be established between a user (i.e., the subscriber) and a service provider (e.g., a wireless telecommunications carrier that provides the service architecture 100) to permit priority treatment for communications associated with the subscriber.

Priority service invocation can be associated with a persona of a user. Personas allow the user to define different treatments for communications with different individuals in his or her address book, to define application-specific treatments, and to define service-specific treatments, including priority service treatments. Treatments can include policies, charging, routing, billing, features, or any service that may be applied. Personas can be used to invoke priority treatment for incoming and/or outgoing communications to an associated device.

A "priority service" persona can be defined for applying a priority treatment to communications initiated by or otherwise involving the "priority service" persona. A "priority service" persona can contain a pattern identifier or a separate header that determines the priority treatment to be applied for that persona. For example, a National Security and Emergency Preparedness ("NS/EP") identifier can be used to indicate NS/EP priority treatment and should be applied for communications initiated by or otherwise involving the "priority service" persona. As another example, a "public safety" group persona can be defined for public safety services, including police, firefighter, medical, and other public safety personnel to indicate that priority treatment should be applied for communications initiated by or otherwise involving public safety personnel that have the "public safety" group persona enabled.

The priority application server 130 also includes a user authorization function 134. The user authorization function 134 authorizes a user to access a priority service to be invoked by the priority service invocation function 132. The user authorization function 134 can communicate with the consolidated network repository 116 to receive information regarding whether a particular user is authorized to access a priority service as will be described in greater detail below. Additional details regarding the operations performed by the user authorization function 134 are described herein below with reference to FIGS. 2 and 4.

The priority application server 130 also includes an anonymity function 136. The anonymity function 136 provides one or more anonymity treatments to a communications session. An anonymity treatment can be a suppression of location information associated with an originating party and/or a destination party of a communications session. Another anonymity treatment can be a translation of an originating party number and/or a destination party number to an alternate number so as to conceal the identity of the originating party and/or the destination party. Additional details on these anonymity treatments are described herein below with reference to FIGS. 2 and 9.

The consolidated network repository 116 provides a repository for resources utilized by the service execution runtime framework 114 to provide one or more services to one or more users. The illustrated consolidated network repository 116 includes one or more service application repositories 138, which, in turn, include a priority service application repository 140. The service application repositories 138 can include any number of repositories in which information associated with any number of services provided by the service execution runtime framework 114 can be stored. The illustrated examples focus on a priority service, and so only the priority service application repository 140 is illustrated. In actual implementation, however, the service application repositories 138 likely will include additional repositories that store information associated with additional services provided by the service execution runtime framework 114.

The priority service application repository 140 includes a credentials database 142. The credentials database 142 stores priority service information, including, for example, credentials, priority level (e.g., low-medium-high, 1-2-3-4-5, or other stratified leveling system), and calling privileges on a per-user basis. The user authorization function 134 can generate queries directed to the credentials database 142 to ascertain whether a particular user is authorized to access a priority service. Additional details in this regard are described herein below with reference to FIGS. 2 and 3.

The priority service application repository 140 includes a translation database 144. The translation database 144 provides number translation for a priority service invoked on a communications session that should be anonymized. The anonymity function 136 can coordinate with the translation database 144 to anonymize a given communications session. Additional details in this regard are described herein below with reference to FIGS. 2 and 9.

Figure 2:
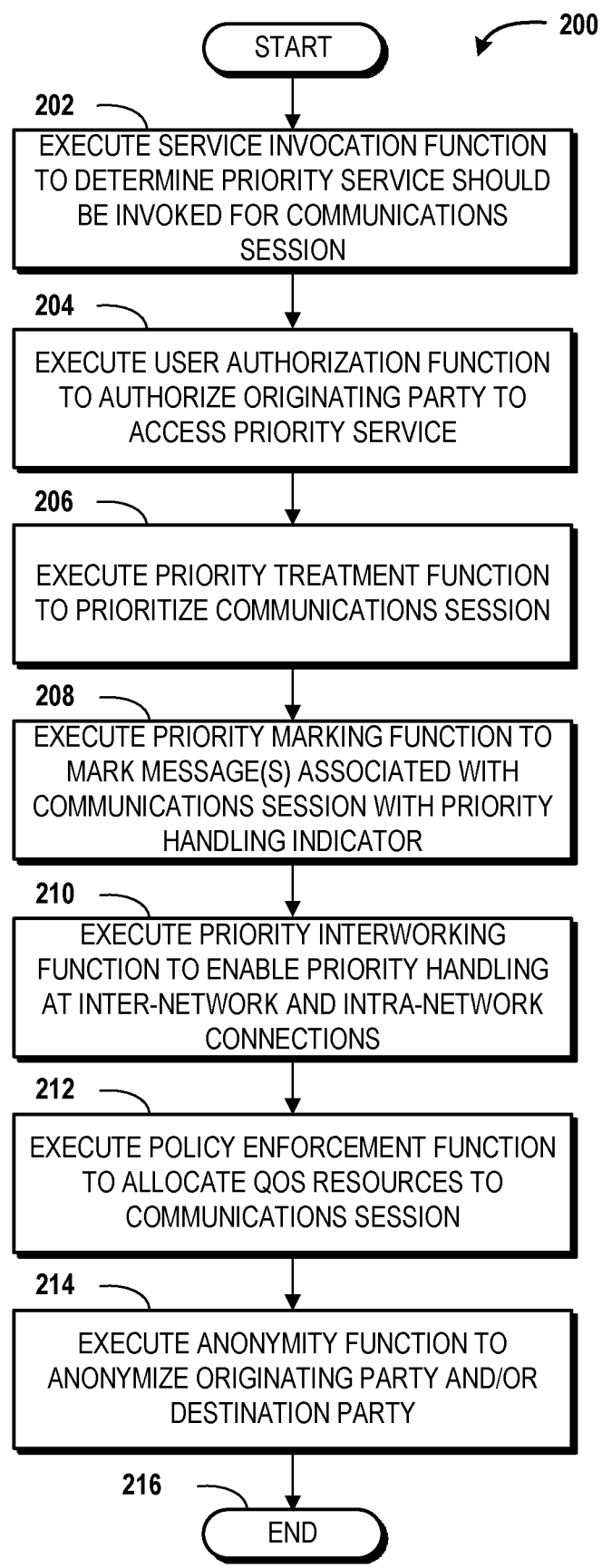
FIG. 2 is a flow diagram illustrating aspects of a method for executing service architecture functions to provide per-session invocation of priority services based upon network available information, according to an illustrative embodiment.

Turning now to FIG. 2, aspects of a method 200 for invoking a priority service for a communications session will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the service execution runtime framework 114, the priority application server 130, the service architecture core 112, one or more of the unmanaged IP devices 102, one or more of the managed devices 104, one or more of the unmanaged TDM devices 106, and/or one or more other computing systems and/or devices disclosed herein.

For purposes of illustrating and describing some of the concepts of the present disclosure, the methods disclosed herein are described as being performed, at least in part, by the service architecture 100 described herein above with reference to FIG. 1, via execution of one or more software modules, which may be embodied, at least in part, by the various functions described above with reference to FIG. 1. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where priority service invocation function 132 is executed to determine whether a priority service should be invoked for a given communications session between an originating device, such as one of the unmanaged IP devices 102, one of the managed devices 104, or one of the unmanaged TDM devices 106, and one or more destination devices, such as another one or more of the unmanaged IP devices 102, one of the managed devices 104, or one of the unmanaged TDM devices 106. Operations performed by the priority service invocation function 132 will be described in greater detail herein below with reference to FIG. 3.

Assuming the priority service invocation function 132 determines that a priority service should be invoked for a given communications session between an originating device and one or more destination devices, the method 200 proceeds to operation 204. At operation 204, the user authorization function 134 is executed by the priority application server 130 within the service execution runtime framework 114 to authorize an originating party associated with the originating device to access the priority service that was determined, at operation 202, to be invoked. Operations performed by the user authorization function 134 will be described in greater detail herein below with reference to FIG. 4.

From operation 204, the method 200 proceeds to operation 206, where the priority treatment function 120 is executed within the service architecture core 112 to prioritize the communications session. Operations performed by the priority treatment function 120 will be described in greater detail herein below with reference to FIG. 5.

From operation 206, the method 200 proceeds to operation 208, where the priority marking function 122 is executed within the service architecture core 112 to mark one or more messages associated with the communications session with a priority handling indicator. The priority handling indicator, in some embodiments, is added to the message header of one or more messages. One or more network nodes utilized to facilitate the communications session can extract the priority handling indicator from a message header and perform prioritization functions in response thereto. Operations performed by the priority marking function 122 will be described in greater detail herein below with reference to FIG. 6.

From operation 208, the method 200 proceeds to operation 210, where the priority interworking function 124 is executed within the service architecture core 112 to enable priority handling at inter-network and intra-network connections. Operations performed by the priority interworking function 124 will be described in greater detail herein below with reference to FIG. 7.

From operation 210, the method 200 proceeds to operation 212, where the policy enforcement function 126 is executed within the service architecture core 112 to allocate QoS resources to the communications session. Operations performed by the policy enforcement function 126 will be described in greater detail herein below with reference to FIG. 8.

From operation 212, the method 200 proceeds to operation 214, where the anonymity function 136 is executed by the priority application server 130 to anonymize originating party and/or destination party during the communications session. Operations performed by the anonymity function 136 will be described in greater detail herein below with reference to FIG. 9.

From operation 214, the method 200 proceeds to operation 216. The method 200 ends at operation 216.

Figure 3:
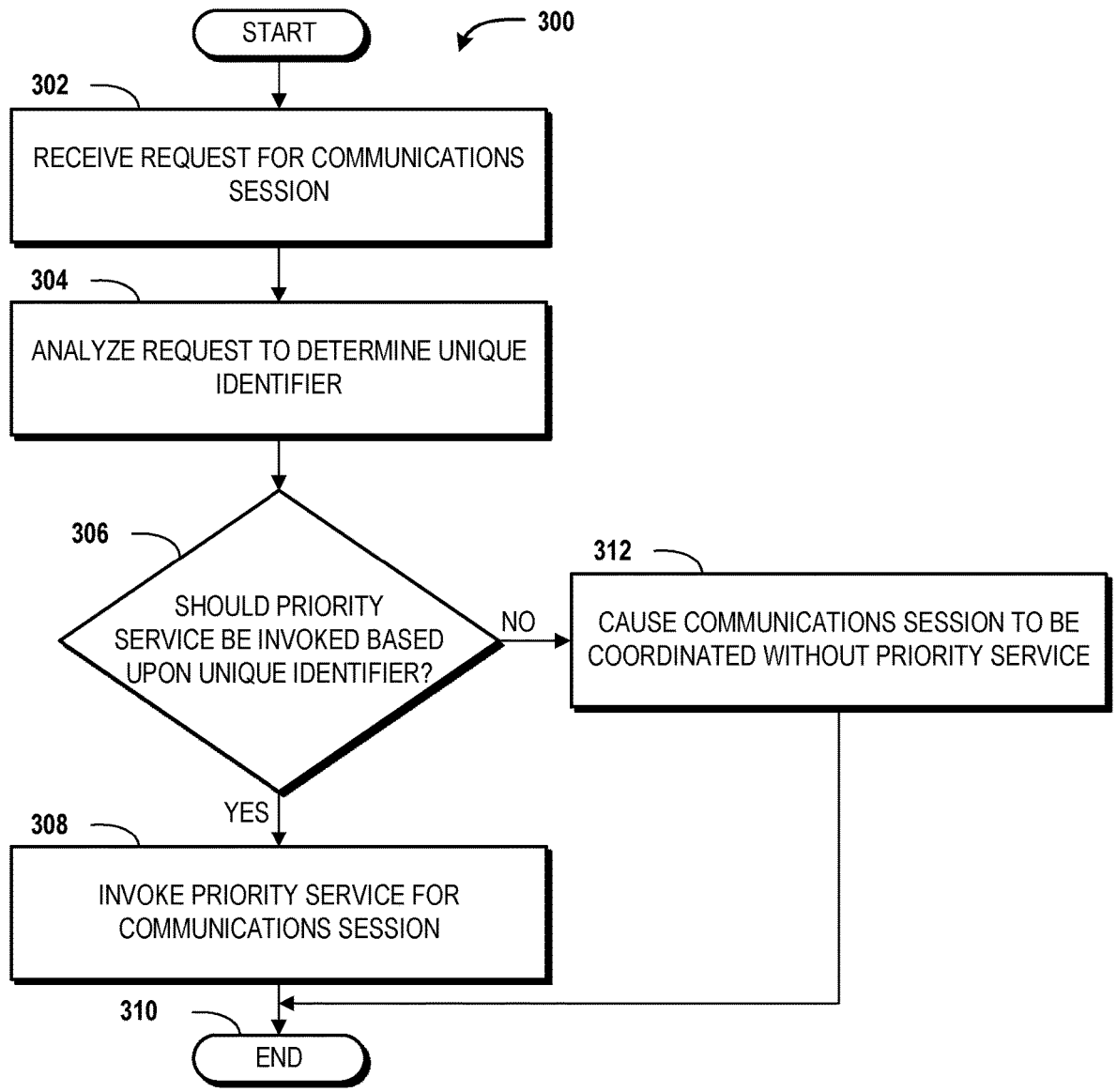
FIG. 3 is a flow diagram illustrating aspects of a method for invoking a priority service for a communications session, according to an illustrative embodiment.

Turning now to FIG. 3, a method 300 for invoking a priority service for a communications session will be described in detail, according to an illustrative embodiment. The method 300 will be described with reference to FIG. 3 and FIG. 1.

The method 300 begins and proceeds to operation 302, where the priority service invocation function 132 receives a request for a communications session. The priority service invocation function 132 can receive the request for a communications session between an originating device and a destination device from the service invocation function 118 of the service architecture core 112. The request, in some embodiments, includes a unique identifier associated with the invocation of a priority service. The unique identifier may be added to the request alone or in combination with one or more credentials, such as, for example, a PIN, password, answer to a security question, and/or username. The unique identifier, and optionally, the credential(s), may be added manually by a user who is the originating party for the communications session. Alternatively, the unique identifier, and optionally, the credential(s), may be added automatically based upon a priority setting enabled on the originating device for one or more communications session types, so that when a communications session of a communication type for which the priority setting is enabled is initiated, the unique identifier, and optionally, the credential(s), are included in a request sent to the service architecture core 112 and forwarded, by the service invocation function 118, to the priority service invocation function 132 executing in the service execution runtime framework 114, as received at operation 302. Another alternative is the use of a feature code as the unique identifier. The feature code may be, for example, a "*" code, such as *272, which precedes a numbering plan area ("NPA") destination number associated with a destination device involved in the communications session.

The request also includes an indication of the type of communications session to be invoked. The communications session may include, but is not limited to, a voice communications session; a video communications session; a GBR data service, which might be a voice service, a video service, or a web service with GBR; a data transport (non-GBR) service, which might be a voice service, a video service or a web service without GBR; a web service for an RTC endpoint; a SMS over IP; an instant messaging service; or a chat service.

The communications session may be utilized in support of the implementation of NS/EP communications policies, programs, and/or procedures. The communications session may be utilized in support of communications among public safety services, including police, firefighter, medical, and other public safety personnel. The communications session may be utilized in support of communications among commercial customers with high priority business needs.

The originating party and/or the destination party(s) involved in the communications session may be emergency first responders, such as authorized NS/EP users. The originating party and/or the destination party(s) involved in the communications session may be public safety personnel. The originating party and/or the destination party(s) involved in the communications session may be commercial customers.

From operation 302, the method 300 proceeds to operation 304, where the priority service invocation function 132 analyzes the request received at operation 302 to determine the unique identifier. From operation 304, the method 300 proceeds to operation 306, where the priority service invocation function 132 determines, based upon the unique identifier, whether a priority service should be invoked for the communications session. If the priority service invocation function 132 determines, based upon the unique identifier, that a priority service should be invoked for the communications session, the method 300 proceeds from operation 306 to operation 308. At operation 308, the priority service invocation function 132 invokes a priority service for the communications session. The method 300 then proceeds to operation 310, where the method 300 ends. If, however, the priority service invocation function 132 determines, based upon the unique identifier, that a priority service should not be invoked for the communications session, the method 300 proceeds from operation 306 to operation 312, where the priority service invocation function 132 causes the communications session to be coordinated without the priority session. The method 300 then proceeds to operation 310, where the method 300 ends.

In some embodiments, the determination made at operation 306 is that a unique identifier is not present in the request. Alternatively, in some other embodiments, the determination made at operation 306 is that the unique identifier is present but is indicative of a service other than the priority service.

In some embodiments, the priority service invocation function 132 causes the communications session to be coordinated without the priority session by notifying one or more network node(s) associated with the coordination of the communications session that the communications session should be carried out as a non-prioritized or standard session, which may involve delays or other interruptions in service depending upon network conditions and/or other factors.

Figure 4:
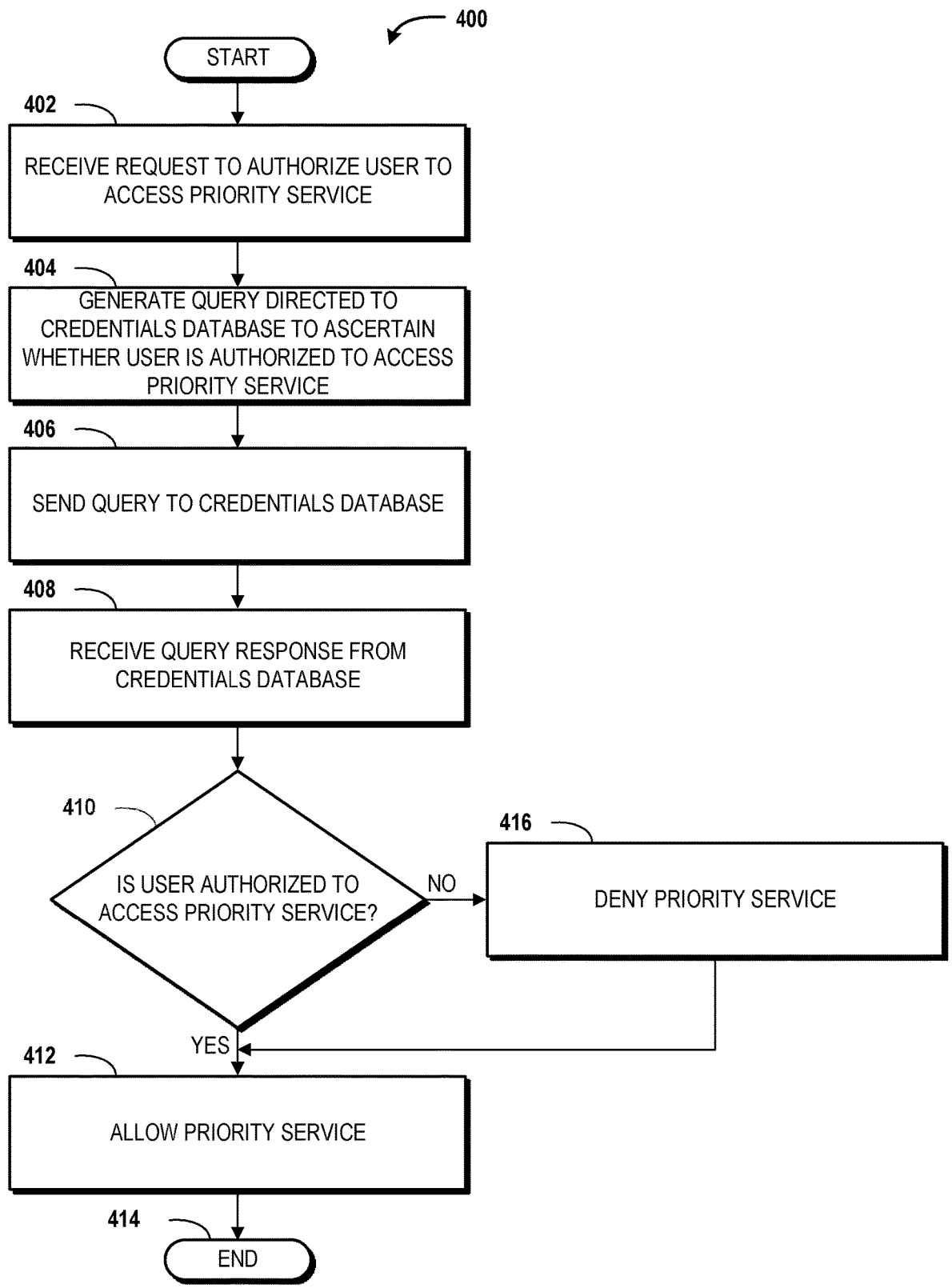
FIG. 4 is a flow diagram illustrating aspects of a method for determining whether a user is authorized to access a priority service, according to an illustrative embodiment.

Turning now to FIG. 4, a method 400 for determining whether a user is authorized to access a priority service will be described in detail, according to an illustrative embodiment. The method 400 will be described with reference to FIG. 4 and FIG. 1.

The method 400 begins and proceeds to operation 402, where the user authorization function 134 receives a request to authorize a user (e.g., an originating party) to access a priority service. The request may be received by the user authorization function 134 from the priority service invocation function 132 in preparation for the priority service invocation function 132 to invoke a priority service for a communications session involving the user. It should be understood that the user authorization function 134 may be used to authorize multiple users for a priority service to be invoked for a given communications session. The multiple users may include one or more originating parties and/or one or more destination parties.

From operation 402, the method 400 proceeds to operation 404, where the user authorization function 134 generates a query directed to the credentials database 142. The query is used by the user authorization function 134 to ascertain whether the user is authorized to access the priority service based upon one or more credentials in a request for a communications session, such as the request described herein above with reference to operation 302 of the method 300 in FIG. 3. From operation 404, the method 400 proceeds to operation 406, where the user authorization function 134 sends the query to the credentials database 142. The credentials database 142 receives the query and performs a lookup operation to compare the received credentials to a set of one or more credentials associated with the user. Based upon the comparison, the credentials database 142 generates a query response, including an indication of whether or not the user is authorized to access the priority service for the communications session, and sends the query response to the user authorization function 134.

From operation 406, the method 400 proceeds to operation 408, where the user authorization function 134 receives the query response from the credentials database 142. From operation 408, the method 400 proceeds to operation 410, where the user authorization function 134 determines, based upon the query response, whether the user is authorized to access the priority service. If the user authorization function 134 determines that the user is authorized to access the priority service, the method 400 proceeds to operation 412, where the user authorization function 134 notifies the priority service invocation function 132 that the priority service should be allowed to be invoked for the communications session. From operation 412, the method 400 proceeds to operation 414, where the method 400 ends. If, however, the user authorization function 134 determines that the user is not authorized to access the priority service, the method 400 proceeds to operation 416, where the user authorization function 134 notifies the priority service invocation function 132 that the priority service should be denied to be invoked for the communications session. From operation 416, the method 400 proceeds to operation 414, where the method 400 ends.

Figure 5:
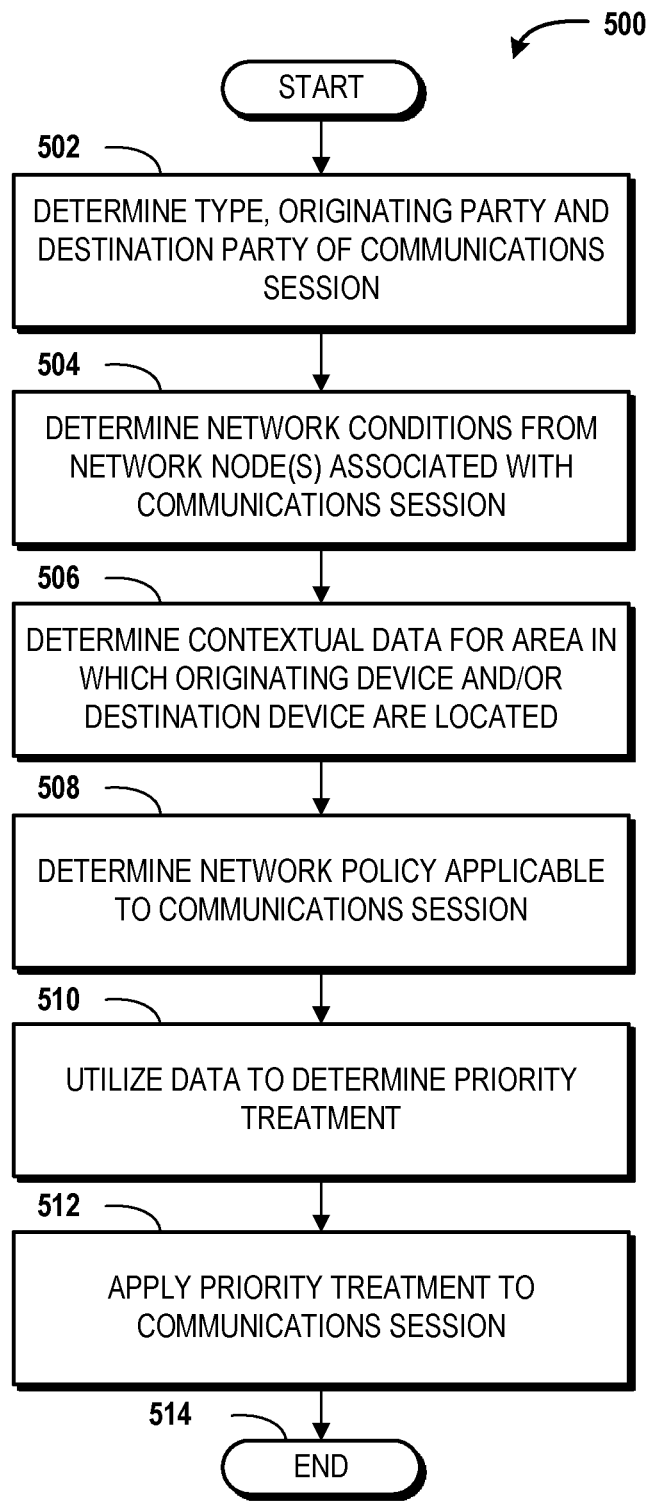
FIG. 5 is a flow diagram illustrating aspects of a method for applying a priority treatment to a communications session, according to an illustrative embodiment.

Turning now to FIG. 5, a method 500 for applying a priority treatment to a communications session will be described in detail, according to an illustrative embodiment. The method 500 will be described with reference to FIG. 5 and FIG. 1.

The method 500 begins and proceeds to operation 502, where the priority treatment function 120 determines a communications session type, an originating party of the communications session, and a destination party of the communications session. It is contemplated that there may be multiple origination parties and/or multiple destination parties of the communications session. The communications session type may be, but is not limited to, a voice communications session; a video communications session; a GBR data service, which might be a voice service, a video service, or a web service with GBR; a data transport (non-GBR) service, which might be a voice service, a video service or a web service without GBR; a web service for an RTC endpoint; a SMS over IP; an instant messaging service; or a chat service.

The communications session may be utilized in support of the implementation of "NS/EP" communications policies, programs, and/or procedures. The communications session may be utilized in support of communications among public safety services, including police, firefighter, medical, and other public safety personnel. The communications session may be utilized in support of communications among commercial customers with high priority business needs.

The originating party(s) and/or the destination party(s) involved in the communications session may be government emergency first responders, such as authorized NS/EP users. The originating party(s) and/or the destination party(s) involved in the communications session may be public safety personnel. The originating party(s) and/or the destination party(s) involved in the communications session may be commercial customers.

The originating party(s) and the destination party(s) may be determined based upon an identifier or combination of identifiers, such as, but not limited to, a mobile subscriber integrated services digital network number ("MSISDN"), an international mobile subscriber identity ("IMSI"), a temporary IMSI ("T-IMSI"), or a combination thereof.

From operation 502, the method 500 proceeds to operation 504, where the priority treatment function 120 determines network conditions from one or more network node(s) associated with the communications session. For example, egress network nodes serving the area which has been affected by a natural disaster or terrorist attack might be over-subscribed by nearby users attempting to utilize their devices for communication.

From operation 504, the method 500 proceeds to operation 506, where the priority treatment function 120 determines contextual data for an area in which originating device and/or destination device are located. Contextual data can include, for example, the occurrence of a natural disaster, terrorist attack, or other natural or man-made circumstance that, in addition to current network conditions, could indicate a developing trend of communications traffic into and out of the area. Contextual data can additionally or alternatively include details regarding the devices located within the area. For example, devices that belong to the U.S. Department of Homeland Security ("DHS")-identified critical infrastructure sectors (i.e., transportation, communications, and the like), federal, state, local, and/or tribal governments may be identified as needing top priority for efforts regarding the reconstitution of operations for these sectors.

From operation 506, the method 500 proceeds to operation 508, where the priority treatment function 120 determines a network policy that is applicable to the communications session. One non-limiting example of a network policy is to reserve infrastructure capacity across selected network nodes for key federal government leaders for use during national crises, during which communications and anonymity are required to provide for enduring constitutional government. Another non-limiting example would be a network policy that supports public safety responders preferentially during state-declared emergencies that require federal assistance. Another non-limiting example would be a business enterprise whose network service is provided by a carrier that requests special handling conditions (e.g., security, bandwidth, priority, and/or other special handling conditions) for their traffic during congestion scenarios.

From operation 508, the method 500 proceeds to operation 510, where the priority treatment function 120 utilizes the data obtained at operations 502-508 to determine a priority treatment for the communications session.

From operation 510, the method 500 proceeds to operation 512, where the priority treatment function 120 applies the priority treatment to the communications session.

From operation 512, the method 500 proceeds to operation 514. The method 500 ends at operation 514.

Figure 6:
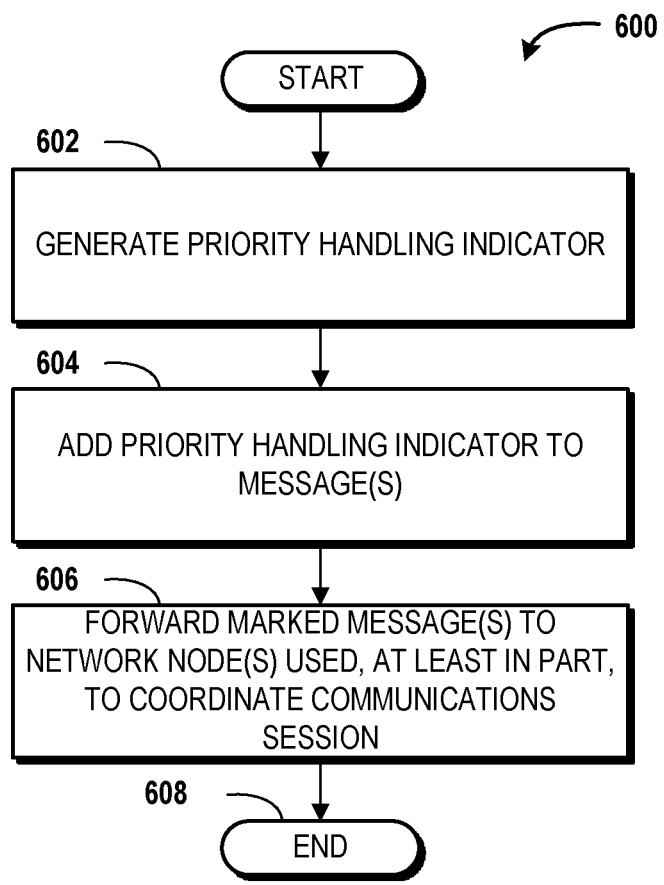
FIG. 6 is a flow diagram illustrating aspects of a method for priority marking of messages involved in a communications session, according to an illustrative embodiment.

Turning now to FIG. 6, a method 600 for priority marking will be described, according to an illustrative embodiment. The method 600 will be described with reference to FIG. 6 and FIG. 1.

The method 600 begins and proceeds to operation 602, where the priority marking function 122 generates a priority handling indicator. The priority handling indicator can include an indication of the priority treatment applied to the communications session, as determined at operation 512 of the method 500 described above with reference to FIG. 5.

From operation 602, the method 600 proceeds to operation 604, where the priority marking function 122 adds the priority handling indicator to one or more messages to be exchanged among network nodes that are used to coordinate the communications session. The messages can include, for example, requests between network nodes for the coordination of various stages of the communications session, including communications session setup, communications session teardown, communications session maintenance, and any other aspects of the communications session.

From operation 604, the method 600 proceeds to operation 606, where the priority marking function 122 forwards the marked message(s) to one or more network nodes to be used, at least in part, to coordinate the communications session with priority.

From operation 606, the method 600 proceeds to operation 608. The method 600 ends at operation 608.

Figure 7:
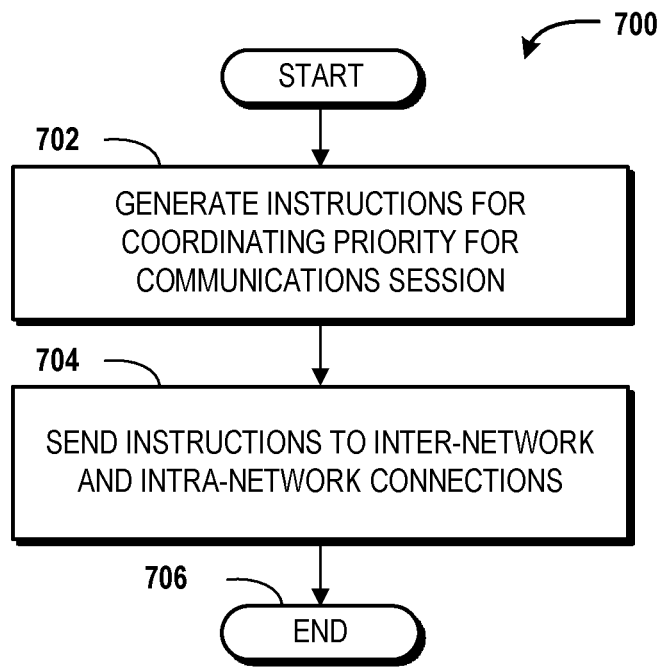
FIG. 7 is a flow diagram illustrating aspects of a method for coordinating priority for inter-network and intra-network connections, according to an illustrative embodiment.

Turning now to FIG. 7, a flow diagram illustrating a method 700 for coordinating priority for inter-network and intra-network connection will be described, according to an illustrative embodiment. The method 700 will be described with reference to FIG. 7 and FIG. 1.

The method 700 begins and proceeds to operation 702, where the priority interworking function 124 generates instructions for coordinating priority for the communications session. From operation 702, the priority interworking function 124 sends the instructions to the inter-network and intra-network connections, which utilize the instructions to coordinate priority treatment for the communications session.

From operation 704, the method 700 proceeds to operation 706. The method 700 ends at operation 706.

Figure 8:
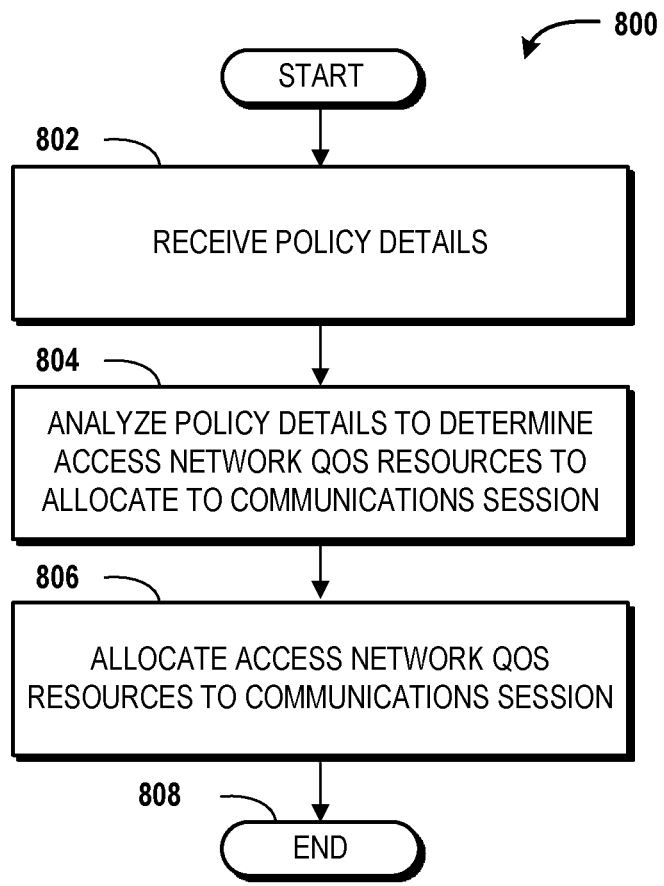
FIG. 8 is a flow diagram illustrating aspects of a method for enforcing a priority policy for a communications session, according to an illustrative embodiment.

Turning now to FIG. 8, a flow diagram illustrating a method 800 for enforcing a priority policy for a communications session will be described, according to an illustrative embodiment. The method 800 will be described with reference to FIG. 8 and FIG. 1.

The method 800 begins and proceeds to operation 802, where the policy enforcement function 126 receives policy details for one or more policies that govern the priority treatment that is to be applied to the communications session. A policy may be received from an entity, such as, but not limited to, a government, a public safety organization, or a business.

From operation 802, the method 800 proceeds to operation 804, where the policy enforcement function 126 analyzes the policy details to determine the access network QoS resources of the IP access networks 108 and/or the circuit access networks 110 to allocate to the communications session.

From operation 804, the method 800 proceeds to operation 806, where the policy enforcement function 126 allocates the access network QoS resources determined at operation 804 to the communications session.

From operation 806, the method 800 proceeds to operation 808. The method 800 ends at operation 808.

Figure 9:
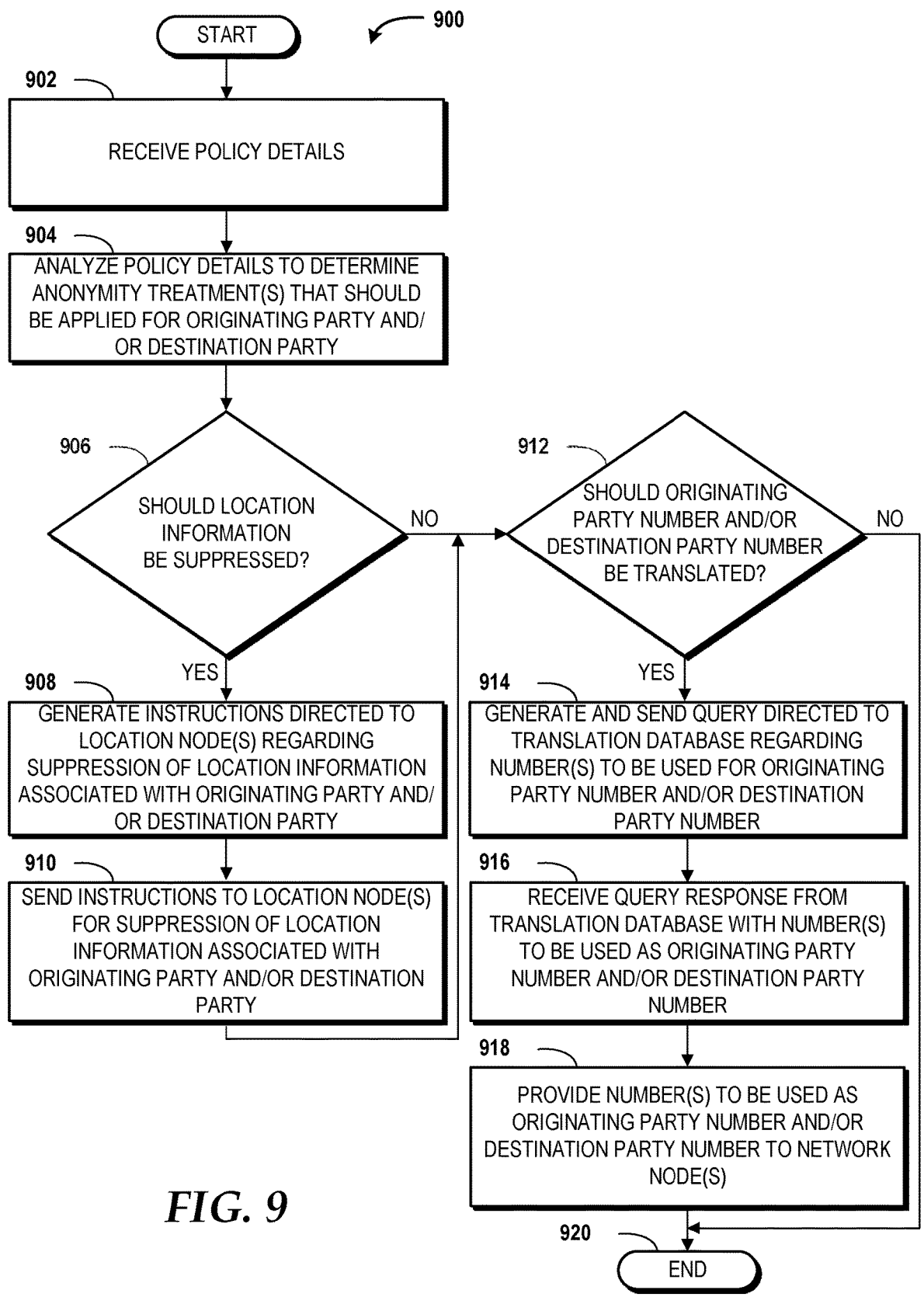
FIG. 9 is a flow diagram illustrating aspects of a method for determining whether to anonymize one or more parties involved in a communications session, according to an illustrative embodiment.

Turning now to FIG. 9, a flow diagram illustrating a method 900 for determining whether to anonymize one or more parties involved in a communications session will be described, according to an illustrative embodiment. The method 900 will be described with reference to FIG. 9 and FIG. 1.

The method 900 begins and proceeds to operation 902, where the anonymity function 136 receives policy details for one or more policies that govern the priority treatment that is to be applied to the communications session. From operation 902, the method 900 proceeds to operation 904, where the anonymity function 136 analyzes the policy details to determine one or more anonymity treatments that should be applied for the originating party(s) and/or the destination party(s) of the communications session.

From operation 904, the method 900 proceeds to operation 906, where the anonymity function 136 determines whether location information should be suppressed for the originating party(s) and/or the destination party(s). If the anonymity function 136 determines that location information should be suppressed for the originating party(s) and/or the destination party(s), the method 900 proceeds to operation 908, where the anonymity function 136 generates instructions directed to one or more location nodes that are utilized to provide location information associated with the originating party(s) and/or the destination party(s). The instructions are utilized to instruct the location node(s) that location information should be suppressed for the originating party(s) and/or the destination party(s). From operation 908, the method 900 proceeds to operation 910, where the anonymity function 136 sends the instructions to the location node(s) for suppression of the location information associated with the originating party(s) and/or the destination party(s).

If, at operation 906, the anonymity function 136 determines that location information should not be suppressed for the originating party(s) or the destination party(s), the method 900 proceeds to operation 912, where the anonymity function 136 determines whether the originating party number(s) and/or the destination party number(s) should be translated. If the anonymity function 136 determines that the originating party number(s) and/or the destination party number(s) should be translated, the method 900 proceeds to operation 914, the anonymity function 136 generates a query and sends the query to the translation database 144. The query can include the originating party number(s) and/or the destination party number(s) to be translated. The translation database 144 receives the query from the anonymity function 136 and translates the originating party number(s) and/or the destination party number(s) as identified in the query into one or more alternate numbers for use during the communications session to maintain number anonymity for the originating party(s) and/or the destination party(s).

From operation 914, the method 900 proceeds to operation 916, where the anonymity function 136 receives a query response from the translation database 144. The query response can include the alternate number(s) for the originating party(s) and/or the destination party(s) to be used as the respective numbers during the communications session. From operation 916, the method 900 proceeds to operation 918, where the anonymity function 136 provides the alternate number(s) received in the query response from the translation database 144 to one or more network nodes that are to be utilized to coordinate the communications session.

From operation 918, the method 900 proceeds to operation 920. The method 900 ends at operation 920. Also, if, at operation 912, the anonymity function 136 determines that the originating party number(s) or the destination party number(s) should not be translated, the method 900 proceeds to operation 920, where the method 900 ends.

Figure 10:
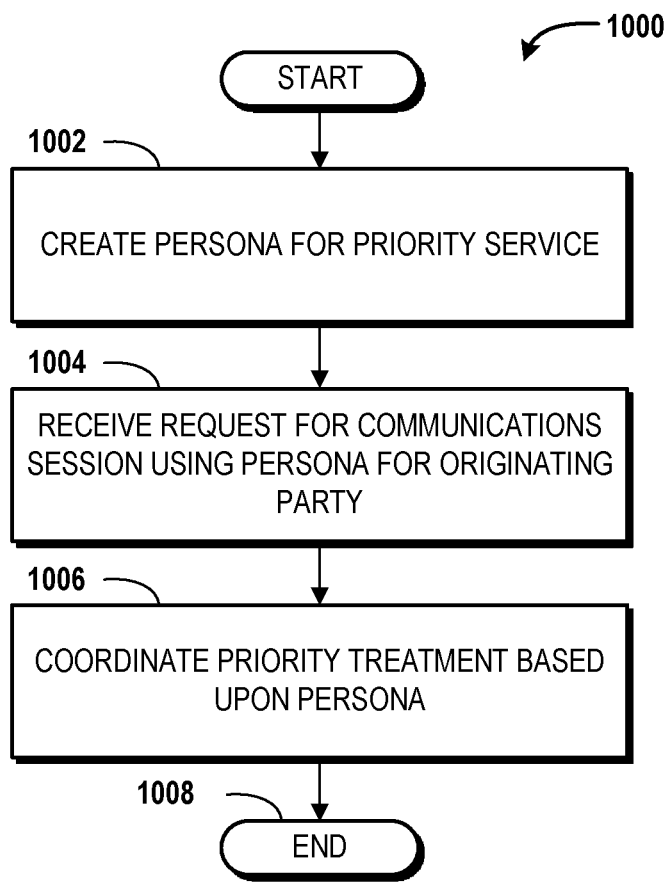
FIG. 10 is a flow diagram illustrating aspects of a method for providing per-session priority based upon a persona, according to an illustrative embodiment.

Turning now to FIG. 10, a flow diagram illustrating a method 1000 for providing per-session priority based upon a persona will be described, according to an illustrative embodiment. The method 1000 will be described with reference to FIG. 10 and FIG. 1.

The method 1000 begins and proceeds to operation 1002, where a persona is created for a user for use when a priority service is to be invoked. Personas allows a user to be associated with different communications services using the same telephone number, such that the user is able to switch between different personas to utilize in different situations. As but one non-limiting example of a user's possible personas, the user may have a first persona for personal use and a second persona for business use. The first persona may be associated with one or more subscription services that are charged and billed to the user. The second persona may be associated with one or more subscription services that are charged and billed to the user's employer. Other examples include the use of different personas for different interactions, such as between spouses, between parents and their children, and the like. In the method 1000, a persona is created at operation 1002 for a user to utilize when a priority service needs to be invoked.

From operation 1002, the method 1000 proceeds to operation 1004, where a request for a communications session using the persona for the originating party is received. From operation 1004, the method 1000 proceeds to operation 1006, where priority treatment is coordinated for the communications session based upon the persona.

From operation 1006, the method 1000 proceeds to operation 1008. The method 1000 ends at operation 1008.

Figure 11:
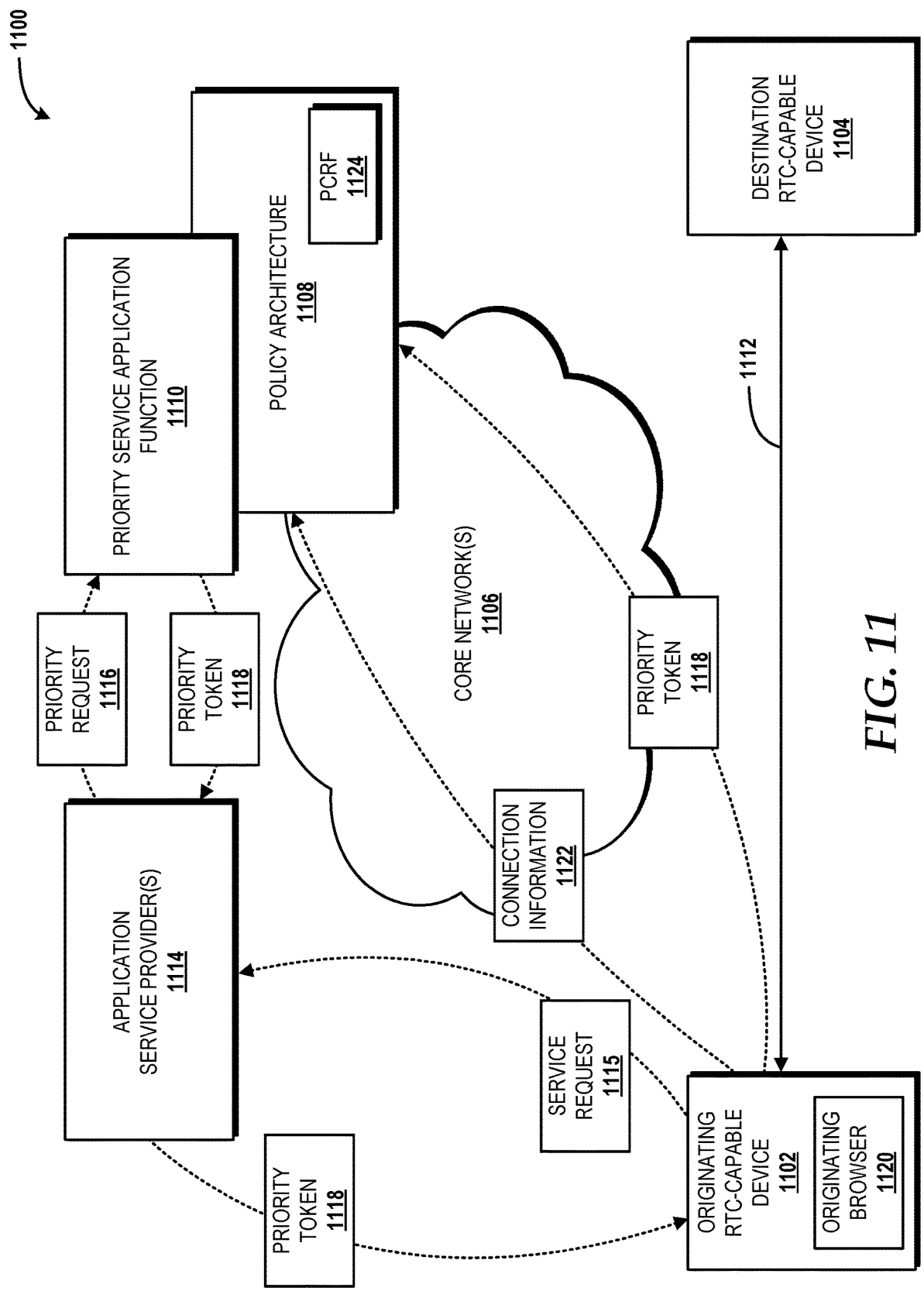
FIG. 11 is an operating environment in which per-session priority services for real-time communications ("RTC") endpoints can be implemented, according to an illustrative embodiment.

Turning now to FIG. 11, an operating environment 1100 in which per-session priority services for real-time communications ("RTC") endpoints can be implemented, according to an illustrative embodiment. The operating environment 1100 includes an originating RTC-capable device 1102 and a destination RTC-capable device 1104. The originating RTC-capable device 1102 and the destination RTC-capable device 1104 may utilize any RTC protocol, including proprietary and standardized protocols. As one non-limiting example, the RTC protocol may be WebRTC, available from World Wide Web Consortium ("W3C"). Accordingly, the originating RTC-capable device 1102 and the destination RTC-capable device 1104 may be a computing device such as, for example, a tablet computing device, a personal computer, a desktop computer, a laptop computer, a notebook computer, a feature phone, a smart phone, other mobile computing devices, a PDA, or the like.

The operating environment 1100 also includes one or more core networks 1106. The core network(s) 1106 can include wireline and/or wireless core networks. A wireline core network may be a network core of a POTS, PSTN, or PBX network, for example. A wireless core network may be a network core of a mobile telecommunications network that utilizes one or more mobile telecommunications technologies. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Although not shown in FIG. 11, the core network(s) 1106 are in communication with one or more access networks, such as one or more of the IP access networks 108 and/or one or more of the circuit access networks 110. The access networks for the wireless core networks may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards.

The operating environment 1100 also includes a policy architecture 1108. The policy architecture 1108 may be or may include the service architecture 100 illustrated and described herein with reference to FIG. 1. In the simplified example shown in FIG. 11, the policy architecture 1108 includes or is otherwise in communication with a priority service application function 1110. The priority service application function 1110 can provide a priority service as described herein above for a communications session 1112 between the originating RTC-capable device 1102 and the destination RTC-capable device 1104 and communications sessions for other RTC endpoints (not shown). In some embodiments, the priority service application function 1110 is or includes the priority service invocation function 132 (best shown in FIG. 1). The priority service application function 1110 can communicate with one or more application service providers 1114. The application service providers 1114 may provide an RTC-based service that facilitates the exchange of audio, video, and multimedia content between users.

In the illustrated example, the originating RTC-capable device 1102 generates a service request 1115 and sends the service request 1115 to the application service provider 1114. The service request 1115 can include an indication of a priority/QoS treatment desired for the communications session 1112. The application service provider 1114 can, in turn, generate a priority request 1116 including the priority/QoS treatment indicated in the service request 1115 and send the priority request 1116 to the priority service application function 1110.

The priority service application function 1110 can receive the priority request 1116 from the application service provider 1114 and generate an encrypted token ("priority token") 1118 in response. The priority service application function 1110 can provide the priority token 1118 to a Dynamic Policy Charging and Control ("DPCC") component (not shown) of the policy architecture 1108 to claim the policy specified in the priority request 1116. The priority service application function 1110 can also send the priority token 1118 to the application service provider 1114.

The application service provider 1114 receives the priority token 1118 from the priority service application function 1110 and delivers the priority token 1118 to the originating RTC-capable device 1102. In some embodiments, the application service provider 1114 adds the priority token 1118 to a JAVASCRIPT module and delivers the priority token 1118 in the JAVASCRIPT module to an originating browser 1120 executing on the originating RTC-capable device 1102. The originating browser 1120 passes the priority token 1118 back to the priority service application function 1110 via the core network(s) 1106 along with connection information 1122 to which the priority token 1118 is to be applied. In this manner, an RTC client cannot arbitrarily request priority treatment to which the RTC client is not entitled. Moreover, this methodology for implementing a priority service for RTC endpoints ensures that only authorized application service providers may acquire tokens and ensures that only specified users can utilize the tokens. The DPCC component (not shown) can confirm that the priority token 1118 is correctly applied for the communications session 1112.

The DPCC can pass relevant priority/QoS and user parameters to a Policy and Charging Rules Function ("PCRF") 1124 of the originating party associated with the originating RTC-capable device 1102 and a PCRF, if different, of the destination party associated with the destination RTC-capable device 1104. The PCRF 1124 can create the bearers appropriate to establish the desired priority treatment for the communications session 1112.

Figure 12:
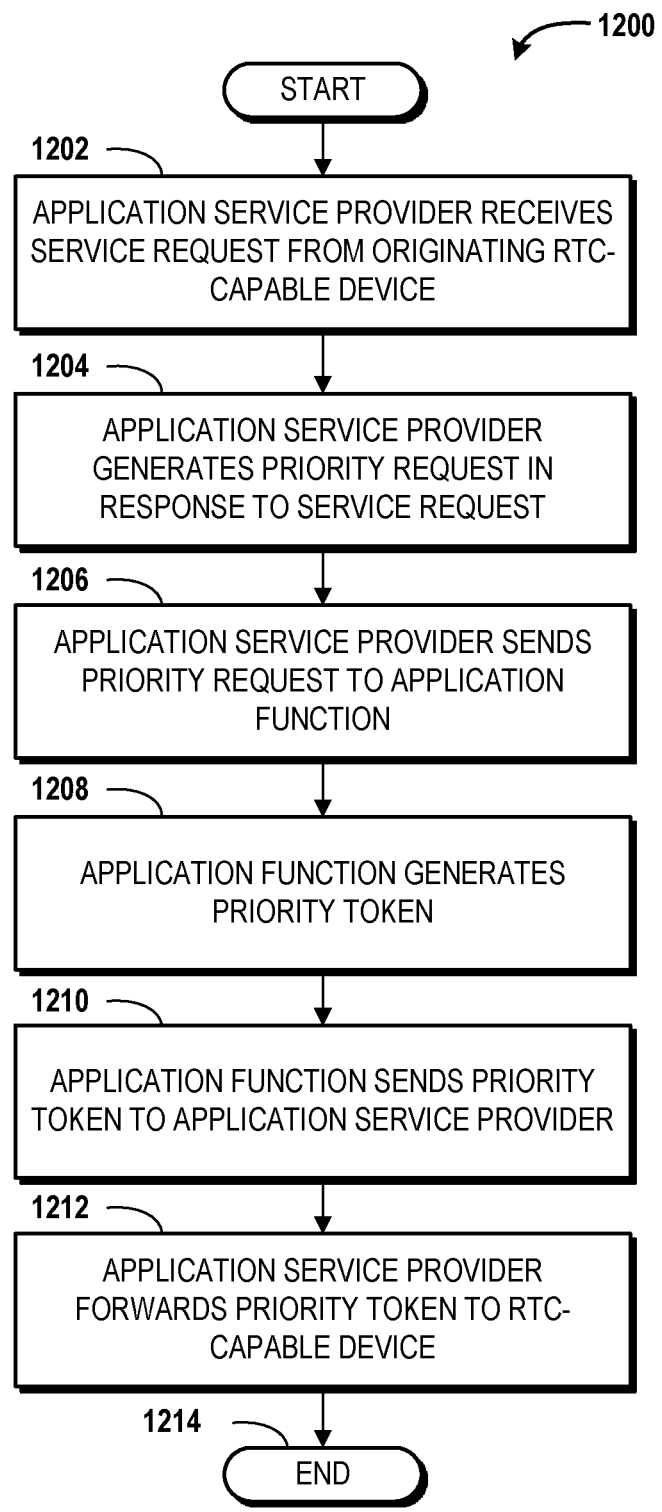
FIG. 12 is a flow diagram illustrating aspects of a method for providing a priority service for RTC endpoints, according to an illustrative embodiment.

Turning now to FIG. 12, a flow diagram illustrating a method 1200 for providing a priority service for an RTC endpoint will be described, according to an illustrative embodiment. The method 1200 will be described with reference to FIG. 12 and FIG. 11.

The method 1200 begins and proceeds to operation 1202, where the application service provider 1114 receives the service request 1115 from the originating RTC-capable device 1102. From operation 1202, the method 1200 proceeds to operation 1204, where the application service provider 1114 generates the priority request 1116 in response to receiving the service request 1115.

From operation 1204, the method 1200 proceeds to operation 1206, where the application service provider 1114 sends the priority request 1116 to the priority service application function 1110. The priority service application function 1110 receives the priority request 1116 and generates, at operation 1208, the priority token 1118. From operation 1208, the method 1200 proceeds to operation 1210, where the priority service application function 1110 sends the priority token 1118 to the application server provider 1114. From operation 1210, the method 1200 proceeds to operation 1212, where the application service provider 1114 forwards the priority token 1118 to the originating RTC-capable device 1102. In some embodiments, the application service provider 1114 forwards the priority token 1118 to the originating RTC-capable device 1102 in a JAVASCRIPT module to the originating browser 1120 executing on the originating RTC-capable device 1102.

From operation 1212, the method 1200 proceeds to operation 1214. The method 1200 ends at operation 1214.

Figure 13:
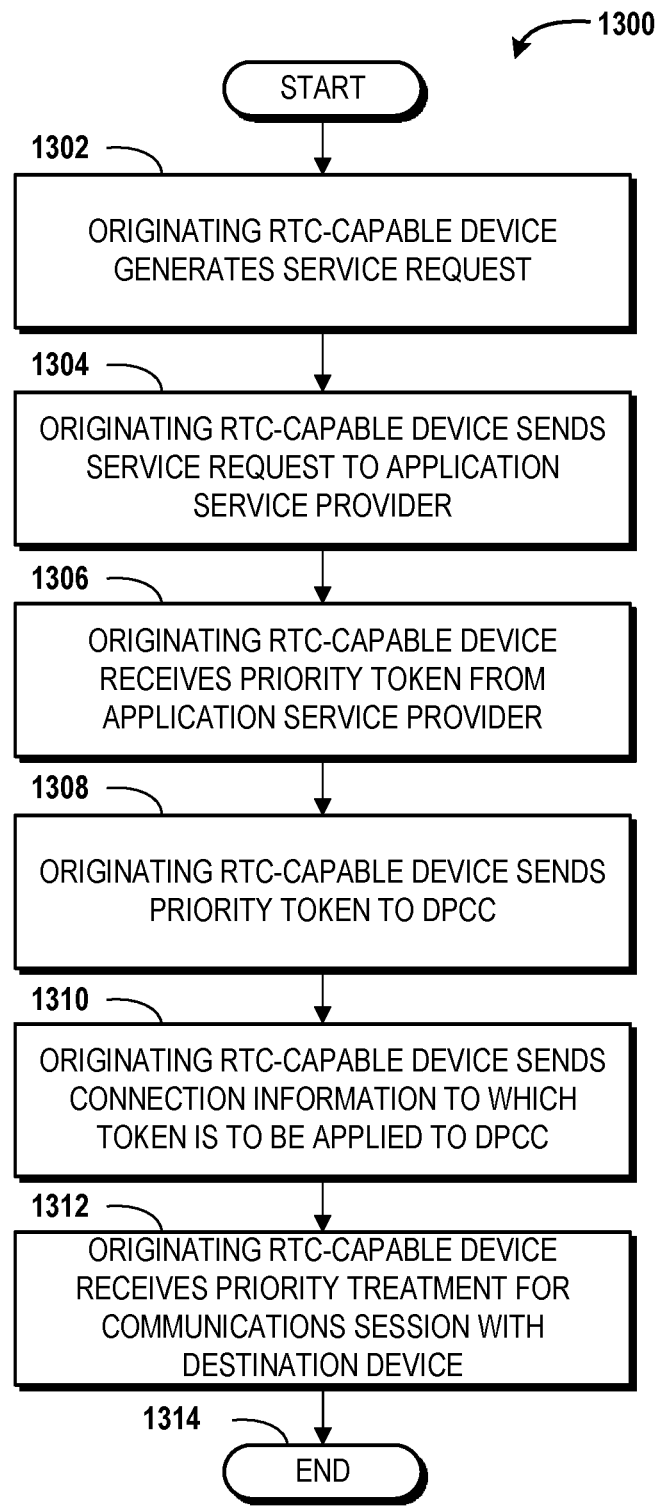
FIG. 13 is a flow diagram illustrating other aspects of a method for providing a priority service for RTC endpoints, according to an illustrative embodiment.

Turning now to FIG. 13, a flow diagram illustrating a method 1300 for providing a priority service for an RTC endpoint will be described, according to an illustrative embodiment. The method 1300 will be described with reference to FIG. 13 and FIG. 11.

The method 1300 begins and proceeds to operation 1302, where the originating RTC-capable device 1102 generates the service request 1115. From operation 1302, the method 1300 proceeds to operation 1304, where the originating RTC-capable device 1102 sends the service request 1115 to the application service provider 1114.

From operation 1304, the method 1300 proceeds to operation 1306, where the originating RTC-capable device 1102 receives the priority token 1118 from the application service provider 1114. From operation 1306, the method 1300 proceeds to operation 1308, where originating RTC-capable device 1102 sends the priority token 1118 to the DPCC. From operation 1308, the method 1300 proceeds to operations 1310, where the originating RTC-capable device 1102 sends the connection information 1122 to which the priority token 1118 is to be applied to the DPCC. From operation 1310, the method 1300 proceeds to operation 1312, where the originating RTC-capable device 1102 receives priority treatment for the communications session 1112 with the destination RTC-capable device 1104.

From operation 1312, the method 1300 proceeds to operation 1314. The method 1300 ends at operation 1314.

Figure 14:
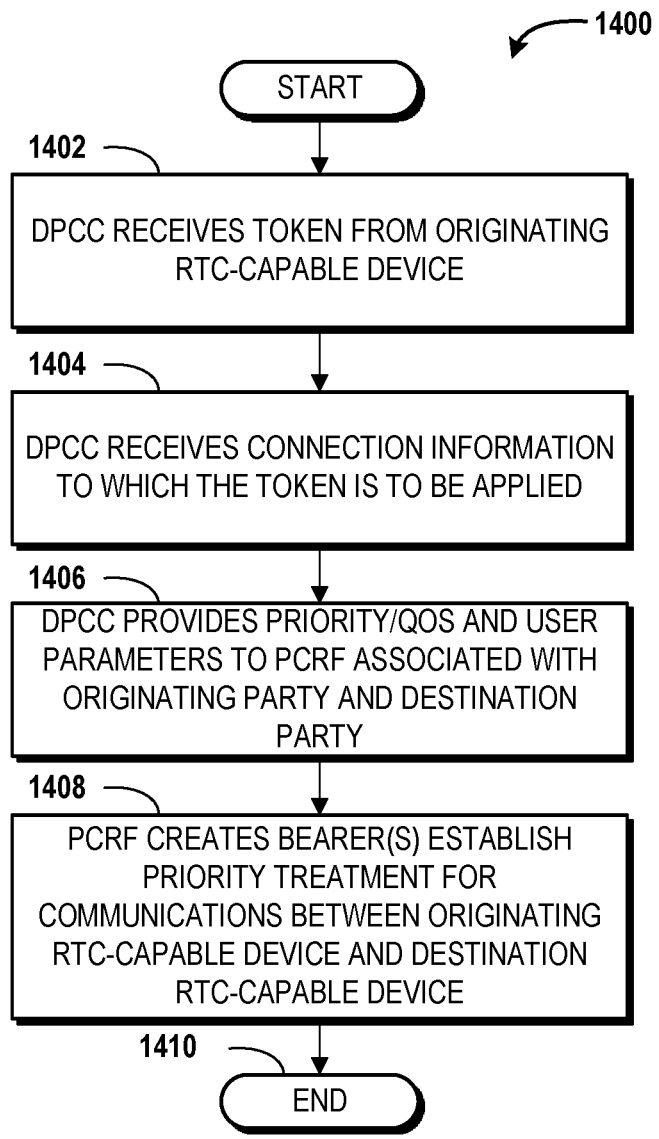
FIG. 14 is a flow diagram illustrating other aspects of a method for providing a priority service for RTC endpoints, according to an illustrative embodiment.

Turning now to FIG. 14, a flow diagram illustrating a method 1400 for providing a priority service for an RTC endpoint will be described, according to an illustrative embodiment. The method 1400 will be described with reference to FIG. 14 and FIG. 11.

The method 1400 begins and proceeds to operation 1402, where DPCC receives the priority token 1118 from the originating RTC-capable device 1102. From operation 1402, the method 1400 proceeds to operation 1404, where the DPCC receives the connection information 1122 to which the priority token 1118 is to be applied.

From operation 1404, the method 1400 proceeds to operation 1406, where the DPCC provides priority/QoS and user parameters to the PCRF 1124 associated with the originating RTC-capable device 1102 and the PCRF, if different, associated with the destination RTC-capable device 1104. From operation 1406, the method 1400 proceeds to operation 1408, where the PCRF 1124 (and the other PCRF if different) creates bearer(s) used to establish priority treatment for the communications session 1112 between the originating RTC-capable device 1102 and the destination RTC-capable device 1104.

From operation 1408, the method 1400 proceeds to operation 1410. The method 1400 ends at operation 1410.

Figure 15:
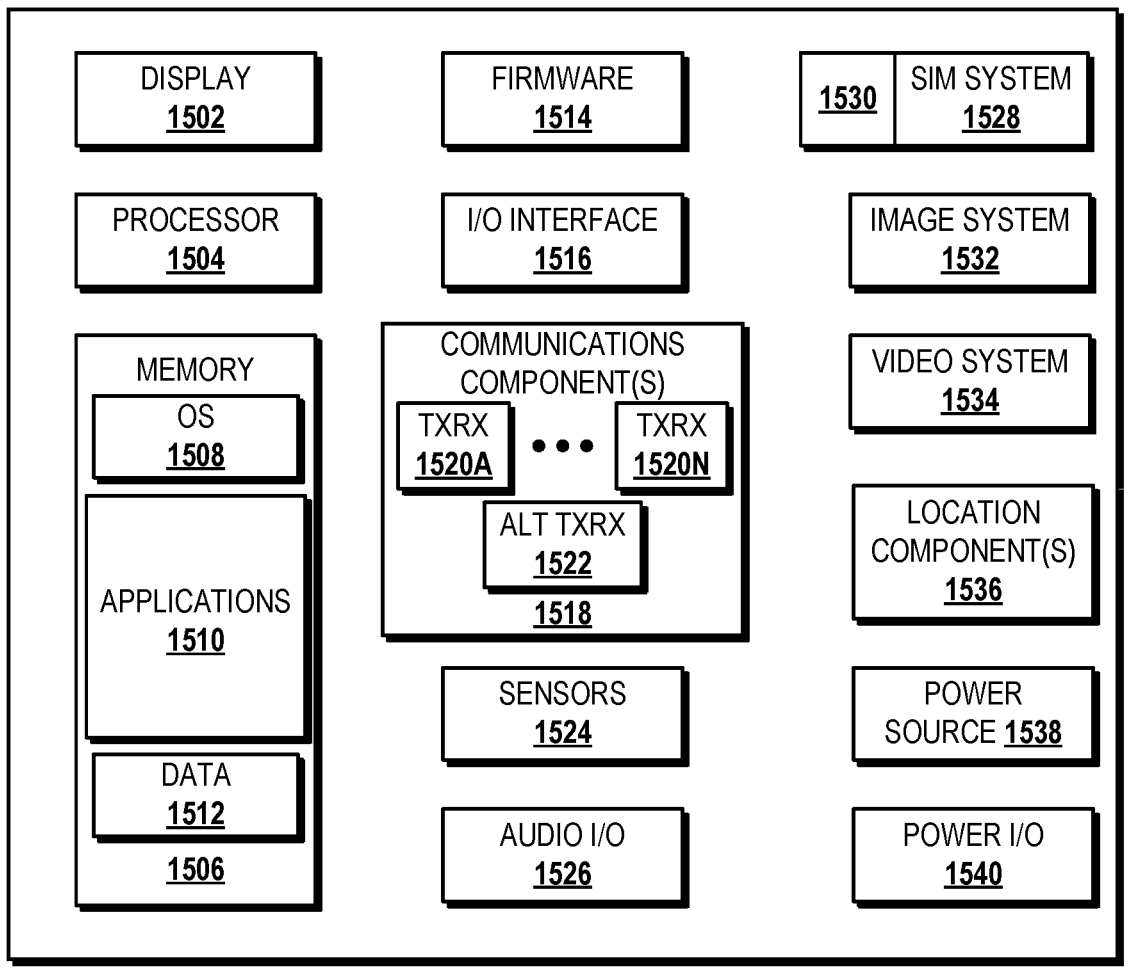
FIG. 15 is a block diagram illustrating an example mobile device capable of implementing aspects of the embodiments disclosed herein.

Turning now to FIG. 15, an illustrative mobile device 1500 and components thereof will be described. In some embodiments, one or more of the unmanaged IP devices 102, one or more of the managed devices 104, the originating RTC-capable device 1102, and/or the destination RTC-capable device 1104 described above can be configured as and/or can have an architecture similar or identical to the mobile device 1500 described herein in FIG. 15. It should be understood, however, that the unmanaged IP device(s) 102, the managed device(s) 104, the originating RTC-capable device 1102, and/or the destination RTC-capable device 1104 may or may not include the functionality described herein with reference to FIG. 15. While connections are not shown between the various components illustrated in FIG. 15, it should be understood that some, none, or all of the components illustrated in FIG. 15 can be configured to interact with one other to carry out various device functions. In some embodiments, the components are arranged so as to communicate via one or more busses (not shown). Thus, it should be understood that FIG. 15 and the following description are intended to provide a general understanding of a suitable environment in which various aspects of embodiments can be implemented, and should not be construed as being limiting in any way.

As illustrated in FIG. 15, the mobile device 1500 can include a display 1502 for displaying data. According to various embodiments, the display 1502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1500 also can include a processor 1504 and a memory or other data storage device ("memory") 1506. The processor 1504 can be configured to process data and/or can execute computer-executable instructions stored in the memory 1506. The computer-executable instructions executed by the processor 1504 can include, for example, an operating system 1508, one or more applications 1510, such as a near-field communications ("NFC") application, other computer-executable instructions stored in a memory 1506, or the like. In some embodiments, the applications 1510 also can include a UI application (not illustrated in FIG. 15).

The UI application can interface with the operating system 1508 to facilitate user interaction with functionality and/or data stored at the mobile device 1500 and/or stored elsewhere. In some embodiments, the operating system 1508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1504 to aid a user in entering content, viewing account information, answering/initiating calls, entering/deleting data, entering and setting user IDs and passwords for device access, configuring settings, manipulating address book content and/or settings, multimode interaction, interacting with other applications 1510, and otherwise facilitating user interaction with the operating system 1508, the applications 1510, and/or other types or instances of data 1512 that can be stored at the mobile device 1500. The data 1512 can include, for example, one or more identifiers, and/or other applications or program modules. According to various embodiments, the data 1512 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1510, the data 1512, and/or portions thereof can be stored in the memory 1506 and/or in a firmware 1514, and can be executed by the processor 1504. The firmware 1514 also can store code for execution during device power up and power down operations. It can be appreciated that the firmware 1514 can be stored in a volatile or non-volatile data storage device including, but not limited to, the memory 1506 and/or a portion thereof.

The mobile device 1500 also can include an input/output ("I/O") interface 1516. The I/O interface 1516 can be configured to support the input/output of data such as location information, user information, organization information, presence status information, user IDs, passwords, and application initiation (start-up) requests. In some embodiments, the I/O interface 1516 can include a hardwire connection such as USB port, a mini-USB port, a micro-USB port, an audio jack, a PS2 port, an IEEE 13154 ("FIREWIRE") port, a serial port, a parallel port, an Ethernet (RJ45) port, an RJ11 port, a proprietary port, combinations thereof, or the like. In some embodiments, the mobile device 1500 can be configured to synchronize with another device to transfer content to and/or from the mobile device 1500. In some embodiments, the mobile device 1500 can be configured to receive updates to one or more of the applications 1510 via the I/O interface 1516, though this is not necessarily the case. In some embodiments, the I/O interface 1516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1516 may be used for communications between the mobile device 1500 and a network device or local device.

The mobile device 1500 also can include a communications component 1518. The communications component 1518 can be configured to interface with the processor 1504 to facilitate wired and/or wireless communications with one or more networks such as one or more of the IP access networks 108 and/or one or more of the circuit access networks 110 described herein. In some embodiments, other networks include networks that utilize non-cellular wireless technologies such as WI-FI or WIMAX. In some embodiments, the communications component 1518 includes a multimode communications subsystem for facilitating communications via the cellular network and one or more other networks.

The communications component 1518, in some embodiments, includes one or more transceivers. The one or more transceivers, if included, can be configured to communicate over the same and/or different wireless technology standards with respect to one another. For example, in some embodiments one or more of the transceivers of the communications component 1518 may be configured to communicate using GSM, CDMAONE, CDMA2000, LTE, and various other 2G, 2.5G, 3G, 4G, and greater generation technology standards. Moreover, the communications component 1518 may facilitate communications over various channel access methods (which may or may not be used by the aforementioned standards) including, but not limited to, TDMA, FDMA, W-CDMA, OFDM, SDMA, and the like.

In addition, the communications component 1518 may facilitate data communications using GPRS, EDGE, the HSPA protocol family including HSDPA, EUL or otherwise termed HSUPA, HSPA+, and various other current and future wireless data access standards. In the illustrated embodiment, the communications component 1518 can include a first transceiver ("TxRx") 1520A that can operate in a first communications mode (e.g., GSM). The communications component 1518 also can include an $N^{th}$ transceiver ("TxRx") 1520N that can operate in a second communications mode relative to the first transceiver 1520A (e.g., UMTS). While two transceivers 1520A-N (hereinafter collectively and/or generically referred to as "transceivers 1520") are shown in FIG. 15, it should be appreciated that less than two, two, and/or more than two transceivers 1520 can be included in the communications component 1518.

The communications component 1518 also can include an alternative transceiver ("Alt TxRx") 1522 for supporting other types and/or standards of communications. According to various contemplated embodiments, the alternative transceiver 1522 can communicate using various communications technologies such as, for example, WI-FI, WIMAX, BLUETOOTH, infrared, IRDA, NFC, other RF technologies, combinations thereof, and the like.

In some embodiments, the communications component 1518 also can facilitate reception from terrestrial radio networks, digital satellite radio networks, internet-based radio service networks, combinations thereof, and the like. The communications component 1518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1500 also can include one or more sensors 1524. The sensors 1524 can include temperature sensors, light sensors, air quality sensors, movement sensors, orientation sensors, noise sensors, proximity sensors, or the like. As such, it should be understood that the sensors 1524 can include, but are not limited to, accelerometers, magnetometers, gyroscopes, infrared sensors, noise sensors, microphones, combinations thereof, or the like. Additionally, audio capabilities for the mobile device 1500 may be provided by an audio I/O component 1526. The audio I/O component 1526 of the mobile device 1500 can include one or more speakers for the output of audio signals, one or more microphones for the collection and/or input of audio signals, and/or other audio input and/or output devices.

The illustrated mobile device 1500 also can include a subscriber identity module ("SIM") system 1528. The SIM system 1528 can include a universal SIM ("USIM"), a universal integrated circuit card ("UICC") and/or other identity devices. The SIM system 1528 can include and/or can be connected to or inserted into an interface such as a slot interface 1530. In some embodiments, the slot interface 1530 can be configured to accept insertion of other identity cards or modules for accessing various types of networks. Additionally, or alternatively, the slot interface 1530 can be configured to accept multiple subscriber identity cards. Because other devices and/or modules for identifying users and/or the mobile device 1500 are contemplated, it should be understood that these embodiments are illustrative, and should not be construed as being limiting in any way.

The mobile device 1500 also can include an image capture and processing system 1532 ("image system"). The image system 1532 can be configured to capture or otherwise obtain photos, videos, and/or other visual information. As such, the image system 1532 can include cameras, lenses, charge-coupled devices ("CCDs"), combinations thereof, or the like. The mobile device 1500 may also include a video system 1534. The video system 1534 can be configured to capture, process, record, modify, and/or store video content. Photos and videos obtained using the image system 1532 and the video system 1534, respectively, may be added as message content to an MMS message, email message, and sent to another mobile device. The video and/or photo content also can be shared with other devices via various types of data transfers via wired and/or wireless communication devices as described herein.

The mobile device 1500 also can include one or more location components 1536. The location components 1536 can be configured to send and/or receive signals to determine a geographic location of the mobile device 1500. According to various embodiments, the location components 1536 can send and/or receive signals from GPS devices, A-GPS devices, WI-FI/WIMAX and/or cellular network triangulation data, combinations thereof, and the like. The location component 1536 also can be configured to communicate with the communications component 1518 to retrieve triangulation data for determining a location of the mobile device 1500. In some embodiments, the location component 1536 can interface with cellular network nodes, telephone lines, satellites, location transmitters and/or beacons, wireless network transmitters and receivers, combinations thereof, and the like. In some embodiments, the location component 1536 can include and/or can communicate with one or more of the sensors 1524 such as a compass, an accelerometer, and/or a gyroscope to determine the orientation of the mobile device 1500. Using the location component 1536, the mobile device 1500 can generate and/or receive data to identify its geographic location, or to transmit data used by other devices to determine the location of the mobile device 1500. The location component 1536 may include multiple components for determining the location and/or orientation of the mobile device 1500.

The illustrated mobile device 1500 also can include a power source 1538. The power source 1538 can include one or more batteries, power supplies, power cells, and/or other power subsystems including alternating current ("AC") and/or direct current ("DC") power devices. The power source 1538 also can interface with an external power system or charging equipment via a power I/O component 1540. Because the mobile device 1500 can include additional and/or alternative components, the above embodiment should be understood as being illustrative of one possible operating environment for various embodiments of the concepts and technologies described herein. The described embodiment of the mobile device 1500 is illustrative, and should not be construed as being limiting in any way.

Figure 16:
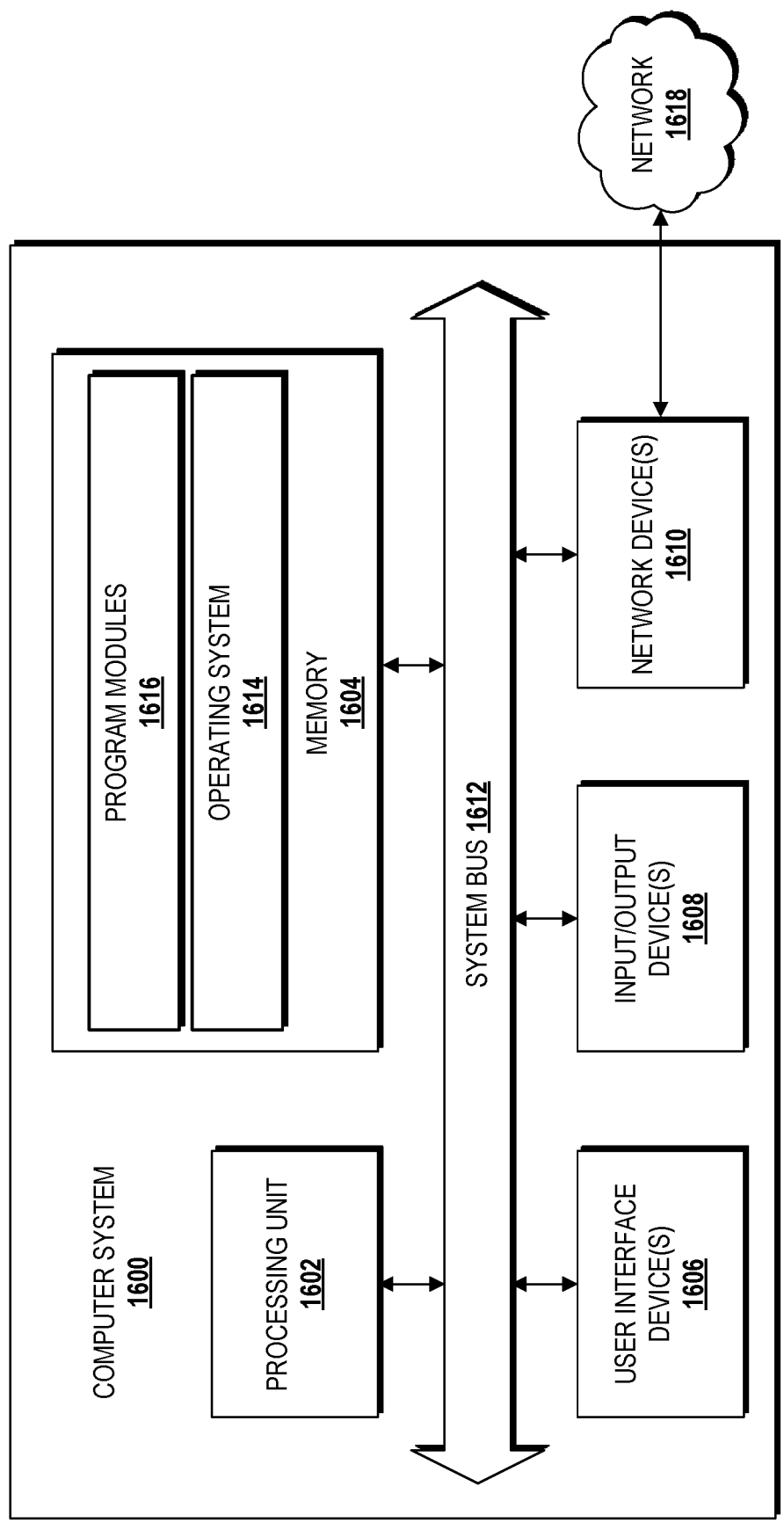
FIG. 16 is a block diagram illustrating an example computer system capable of implementing aspects of the embodiments presented herein.

FIG. 16 is a block diagram illustrating a computer system 1600 configured to provide the functionality in accordance with various embodiments of the concepts and technologies disclosed herein. In some implementations, one or more of the unmanaged IP devices 102, one or more of the managed devices 104, the originating RTC-capable device 1102, and/or the destination RTC-capable device 1104 utilize an architecture that is the same as or similar to the architecture of the computer system 1600. It should be understood, however, that modification to the architecture may be made to facilitate certain interactions among elements described herein. The service architecture 100 may also use the computer system 1600 or portions thereof to enable the invocation of priority services on a per-session basis.

The computer system 1600 includes a processing unit 1602, a memory 1604, one or more user interface devices 1606, one or more input/output ("I/O") devices 1608, and one or more network devices 1610, each of which is operatively connected to a system bus 1612. The bus 1612 enables bi-directional communication between the processing unit 1602, the memory 1604, the user interface devices 1606, the I/O devices 1608, and the network devices 1610.

The processing unit 1602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1604 communicates with the processing unit 1602 via the system bus 1612. In some embodiments, the memory 1604 is operatively connected to a memory controller (not shown) that enables communication with the processing unit 1602 via the system bus 1612. The memory 1604 includes an operating system 1614 and one or more program modules 1616. The operating system 1614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1616 may include various software and/or program modules to perform the various operations described herein. The program modules 1616 and/or other programs can be embodied in computer-readable media containing instructions that, when executed by the processing unit 1602, perform various operations such as those described herein. According to embodiments, the program modules 1616 may be embodied in hardware, software, firmware, or any combination thereof.

By way of example, and not limitation, computer-readable media may include any available computer storage media or communication media that can be accessed by the computer system 1600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1600. In the claims, the phrase "computer storage medium" and variations thereof does not include waves or signals per se and/or communication media.

The user interface devices 1606 may include one or more devices with which a user accesses the computer system 1600. The user interface devices 1606 may include, but are not limited to, computers, servers, PDAs, cellular phones, or any suitable computing devices. The I/O devices 1608 enable a user to interface with the program modules 1616. In one embodiment, the I/O devices 1608 are operatively connected to an I/O controller (not shown) that enables communication with the processing unit 1602 via the system bus 1612. The I/O devices 1608 may include one or more input devices, such as, but not limited to, a keyboard, a mouse, or an electronic stylus. Further, the I/O devices 1608 may include one or more output devices, such as, but not limited to, a display screen or a printer.

The network devices 1610 enable the computer system 1600 to communicate with other networks or remote systems via a network 1618. Examples of the network devices 1610 include, but are not limited to, a modem, a radio frequency ("RF") or infrared ("IR") transceiver, a telephonic interface, a bridge, a router, or a network card. The network 1618 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1618 may be a wired network such as, but not limited to, a Wide Area Network ("WAN"), a wired Personal Area Network ("PAN"), or a wired Metropolitan Area Network ("MAN"). The network 1618 may be any other network described herein.

Figure 17:
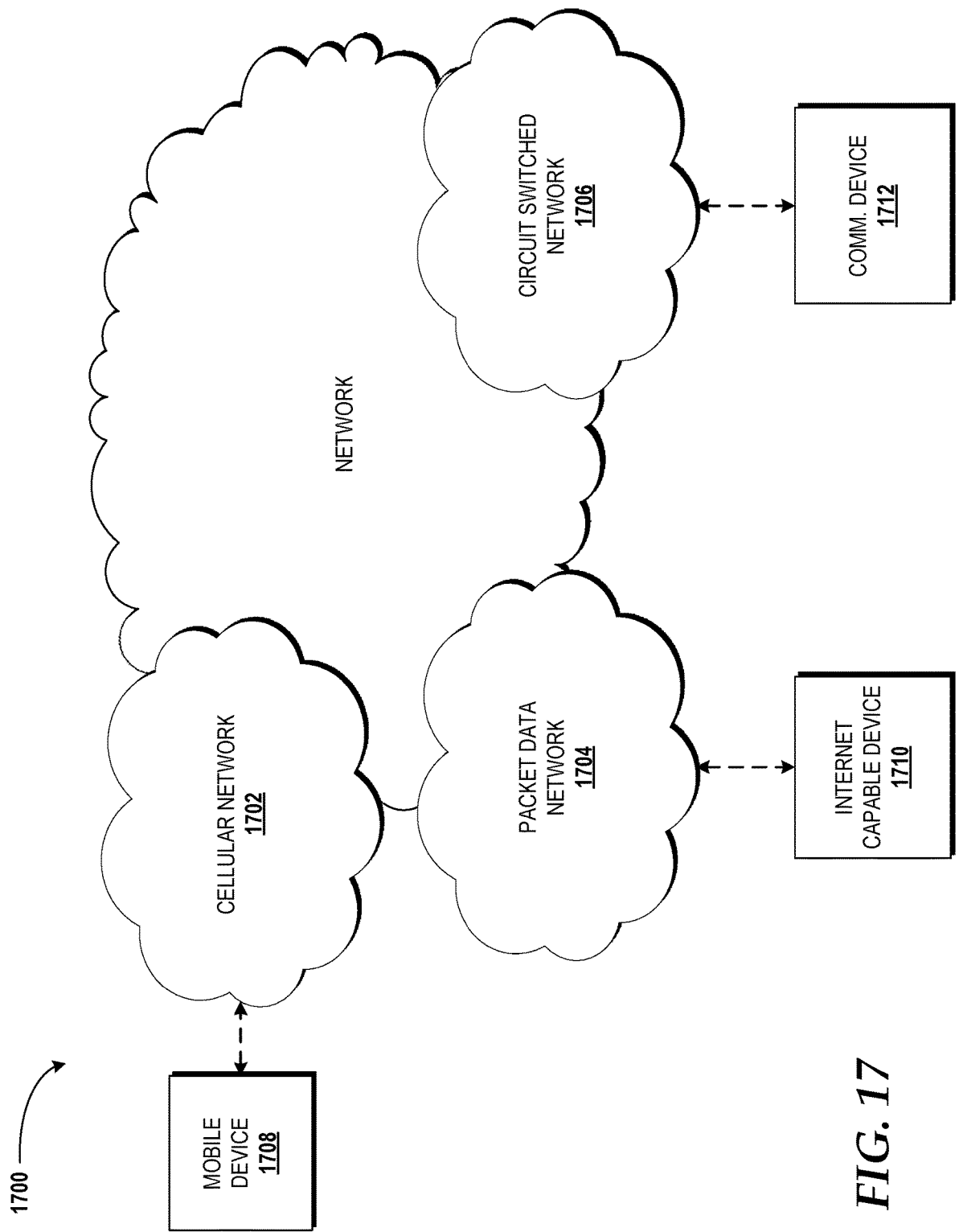
FIG. 17 is a diagram illustrating a network, according to an illustrative embodiment.

Turning now to FIG. 17, details of a network 1700 are illustrated, according to an illustrative embodiment. The network 1700 includes a cellular network 1702, a packet data network 1704, for example, the Internet, and a circuit switched network 1706, for example, a PSTN. The cellular network 1702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IMS, and the like. The cellular network 1702 also includes radios and nodes for receiving and transmitting voice, data, and combinations thereof to and from radio transceivers, networks, the packet data network 1704, and the circuit switched network 1706. The network 1700 can also include the service architecture 100 illustrated and described above with reference to FIG. 1.

A mobile communications device 1708, such as, for example, a cellular telephone, a user equipment, a mobile terminal, a PDA, a laptop computer, a handheld computer, the managed device 104, and combinations thereof, can be operatively connected to the cellular network 1702. The cellular network 1702 can be configured as a 2G GSM network and can provide data communications via GPRS and/or EDGE. Additionally, or alternatively, the cellular network 1702 can be configured as a 3G UMTS network and can provide data communications via the HSPA protocol family, for example, HSDPA, EUL (also referred to as HSUPA), and HSPA+. The cellular network 1702 also is compatible with 4G mobile communications standards such as LTE, or the like, as well as evolved and future mobile standards.

The packet data network 1704 includes various devices, for example, servers, computers, databases, and other devices in communication with one another, as is generally known. The packet data network 1704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1704 includes or is in communication with the Internet. The circuit switched network 1706 includes various hardware and software for providing circuit switched communications. The circuit switched network 1706 may include, or may be, what is often referred to as a POTS. The functionality of a circuit switched network 1706 or other circuit-switched network are generally known and will not be described herein in detail.

The illustrated cellular network 1702 is shown in communication with the packet data network 1704 and a circuit switched network 1706, though it should be appreciated that this is not necessarily the case. One or more Internet-capable devices 1710, for example, the unmanaged IP device 102, a PC, a laptop, a portable device, or another suitable device, can communicate with one or more cellular networks 1702, and devices connected thereto, through the packet data network 1704. It also should be appreciated that the Internet-capable device 1710 can communicate with the packet data network 1704 through the circuit switched network 1706, the cellular network 1702, and/or via other networks (not illustrated).

As illustrated, a communications device 1712, for example, the unmanaged TDM device 106, a telephone, facsimile machine, modem, computer, or the like, can be in communication with the circuit switched network 1706, and therethrough to the packet data network 1704 and/or the cellular network 1702. It should be appreciated that the communications device 1712 can be an Internet-capable device, and can be substantially similar to the Internet-capable device 1710. In the specification, the network 1700 is used to refer broadly to any combination of the networks 1702, 1704, 1706. It should be appreciated that substantially all of the functionality described with reference to the network 1700 can be performed by the cellular network 1702, the packet data network 1704, and/or the circuit switched network 1706, alone or in combination with other networks, network elements, and the like.

Based on the foregoing, it should be appreciated that concepts and technologies directed to per-session invocation of priority services based upon network available information have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A system comprising:
 a priority service application repository;
 a processor; and
 memory that stores a service execution runtime framework comprising a priority service application that, when executed by the processor, causes the processor to perform operations comprising
  storing, for an entity, a plurality of personal and non-personal personas, wherein each persona of the plurality of personal and non-personal personas allows the entity to be associated with different selectable communications services using a same entity identifier, such that the entity is able to switch among the plurality of personal and non-personal personas to utilize in different situations, wherein a first persona of the plurality of personal and non-personal personas is associated with a first communications service, and wherein a second persona of the plurality of personal and non-personal personas is associated with a second communications service to which the entity is subscribed on behalf of another entity,
  creating a priority service persona for the entity,
  saving, for the entity, the priority service persona with the plurality of personal and non-personal personas, wherein the priority service persona is associated with a priority communications service that, when used for a communications session that involves the same entity identifier, causes a priority treatment to be applied to the communications session,
  receiving a request to invoke the priority communications service for the communications session, wherein the request comprises the priority service persona that identifies the priority treatment to be applied to the communications session, and wherein the request further comprises a credential,
  generating a query directed to the priority service application repository to determine whether the entity is authorized to access the priority communications service, wherein the query comprises the credential,
  receiving, from the priority service application repository, a query response indicating that the entity is authorized to access the priority communications service, and
  determining based, at least in part, upon the priority service persona that the priority communications service should be invoked for the communications session and the priority treatment should be applied to the communications session.

2. The system of claim 1, wherein the operations further comprise, in response to determining based, at least in part, upon the priority service persona that the priority communications service should be invoked for the communications session and the priority treatment should be applied to the communications session, invoking the priority communications service for the communications session and applying the priority treatment to the communications session.

3. The system of claim 1, wherein the second persona is a non-personal persona, and wherein the second communications service is a non-personal communications service.

4. The system of claim 1, wherein the entity is an originating party for the communications session.

5. The system of claim 4, wherein the priority service persona is provided by an originating device associated with the originating party for the communications session based upon a priority setting enabled on the originating device.

6. A method comprising:
 storing, by a system comprising a priority service application repository, a processor, and memory, for an entity, a plurality of personal and non-personal personas, wherein each persona of the plurality of personal and non-personal personas allows the entity to be associated with different selectable communications services using a same entity identifier, such that the entity is able to switch among the plurality of personal and non-personal personas to utilize in different situations, wherein a first persona of the plurality of personal and non-personal personas is associated with a first communications service, and wherein a second persona of the plurality of personal and non-personal personas is associated with a second communications service to which the entity is subscribed on behalf of another entity;
 creating, by the system, a priority service persona for the entity;
 saving, by the system, for the entity, the priority service persona with the plurality of personal and non-personal personas, wherein the priority service persona is associated with a priority communications service that, when used for a communications session that involves the same entity identifier, causes a priority treatment to be applied to the communications session;
 receiving, by the system, a request to invoke the priority communications service for the communications session, wherein the request comprises the priority service persona that identifies the priority treatment to be applied to the communications session, and wherein the request further comprises a credential;
 generating, by the system, a query directed to the priority service application repository to determine whether the entity is authorized to access the priority communications service, wherein the query comprises the credential;
 receiving, from the priority service application repository, a query response indicating that the entity is authorized to access the priority communications service; and
 determining, by the system, based, at least in part, upon the priority service persona that the priority communications service should be invoked for the communications session and the priority treatment should be applied to the communications session.

7. The method of claim 6, further comprising, in response to determining based upon the priority service persona that the priority communications service should be invoked for the communications session and the priority treatment should be applied to the communications session, invoking the priority communications service for the communications session and applying the priority treatment to the communications session.

8. The method of claim 6, wherein the second persona is a non-personal persona, and wherein the second communications service is a non-personal communications service.

9. The method of claim 6, wherein the entity is an originating party for the communications session.

10. The method of claim 9, wherein the priority service persona is provided by an originating device associated with the originating party for the communications session based upon a priority setting enabled on the originating device.

11. A computer storage medium having instructions stored thereon that, when executed by a processor of a system comprising a priority service application repository, cause the processor to perform operations comprising:

storing, for an entity, a plurality of personal and non-personal personas, wherein each persona of the plurality of personal and non-personal personas allows the entity to be associated with different selectable communications services using a same entity identifier, such that the entity is able to switch among the plurality of personal and non-personal personas to utilize in different situations, wherein a first persona of the plurality of personal and non-personal personas is associated with a first communications service, and wherein a second persona of the plurality of personal and non-personal personas is associated with a second communications service to which the entity is subscribed on behalf of another entity;

creating a priority service persona for the entity;

saving, for the entity, the priority service persona with the plurality of personal and non-personal personas, wherein the priority service persona is associated with a priority communications service that, when used for a communications session that involves the same entity identifier, causes a priority treatment to be applied to the communications session;

receiving a request to invoke the priority communications service for the communications session, wherein the request comprises the priority service persona that identifies the priority treatment to be applied to the communications session, and wherein the request further comprises a credential;

generating a query directed to the priority service application repository to determine whether the entity authorized to access the priority communications service, wherein the query comprises the credential;

receiving, from the priority service application repository, a query response indicating that the entity is authorized to access the priority communications service; and determining based, at least in part, upon the priority service persona that the priority communications service should be invoked for the communications session and the priority treatment should be applied to the communications session.

12. The computer storage medium of claim 11, wherein the operations further comprise, in response to determining based, at least in part, upon the priority service persona that the priority communications service should be invoked for the communications session and the priority treatment should be applied to the communications session, invoking the priority communications service for the communications session and applying the priority treatment to the communications session.

13. The computer storage medium of claim 11, wherein the second persona is a non-personal persona, and wherein the second communications service is a non-personal communications service.

14. The computer storage medium of claim 13, wherein the entity is subscribed to the non-personal communications service on behalf of the another entity.

\* \* \* \* \*